United States Patent [19]

Emma et al.

[11] Patent Number: 4,991,080
[45] Date of Patent: Feb. 5, 1991

[54] PIPELINE PROCESSING APPARATUS FOR EXECUTING INSTRUCTIONS IN THREE STREAMS, INCLUDING BRANCH STREAM PRE-EXECUTION PROCESSOR FOR PRE-EXECUTING CONDITIONAL BRANCH INSTRUCTIONS

[75] Inventors: Philip G. Emma, Danbury, Conn.; James H. Pomerene, Chappaqua; Rudolph N. Rechtschaffen, Scarsdale, both of N.Y.; Frank J. Sparacio, North Bergen, N.J.

[73] Assignee: International Business Machines Corporation, Armonk, N.Y.

[21] Appl. No.: 839,312

[22] Filed: Mar. 13, 1986

[51] Int. Cl.⁵ .......................... G06F 9/38; G06F 9/28
[52] U.S. Cl. .................................. 364/200; 364/263; 364/261.3; 364/261.5; 364/263.1; 364/262.4; 364/261.7
[58] Field of Search ... 364/200 MS File, 900 MS File

[56]  References Cited

U.S. PATENT DOCUMENTS

| | | | |
|---|---|---|---|
| 3,559,183 | 1/1971 | Sussenguth | 364/200 |
| 3,707,725 | 12/1972 | Delheim | 364/200 |
| 4,062,058 | 12/1977 | Haynes | 364/200 |
| 4,155,120 | 5/1979 | Keefer et al. | 364/200 |
| 4,270,167 | 5/1981 | Koehler et al. | 364/200 |
| 4,325,120 | 4/1982 | Colley et al. | 364/200 |
| 4,338,675 | 7/1982 | Palmer et al. | 364/748 |
| 4,442,484 | 4/1984 | Childs, Jr. et al. | 364/200 |
| 4,471,433 | 9/1984 | Matsumoto et al. | 364/200 |
| 4,477,872 | 10/1984 | Losq et al. | 364/200 |
| 4,547,849 | 10/1985 | Louie et al. | 364/200 |
| 4,569,018 | 2/1986 | Hummel et al. | 364/200 |
| 4,594,651 | 6/1986 | Jaswa et al. | 364/131 |
| 4,597,041 | 6/1986 | Guyer | 364/200 |
| 4,604,691 | 8/1986 | Akagi | 364/200 |
| 4,608,659 | 8/1986 | Bradley | 364/737 |
| 4,691,277 | 9/1987 | Kronstadt et al. | 364/200 |
| 4,701,842 | 10/1987 | Olnowich | 364/200 |
| 4,710,866 | 12/1987 | Zolnowsky et al. | 364/200 |
| 4,719,570 | 1/1988 | Kawabe | 364/200 |
| 4,725,947 | 2/1988 | Shonai | 364/200 |
| 4,742,451 | 5/1988 | Bruckert et al. | 364/200 |
| 4,764,861 | 8/1988 | Shibuya | 364/200 |
| 4,819,154 | 4/1989 | Stiffler | 364/200 |
| 4,821,183 | 4/1989 | Hauris | 364/200 |
| 4,827,402 | 5/1989 | Wada | 364/200 |
| 4,858,104 | 8/1989 | Matsuo | 364/200 |

OTHER PUBLICATIONS

The New Riverside Dictionary by Houghton Mifflin Co., 1984, pp. 640, 641, Riverside Publishing Co.

*Primary Examiner*—David Y. Eng
*Assistant Examiner*—Eric Coleman
*Attorney, Agent, or Firm*—Sughrue, Mion, Zinn, Macpeak & Seas

[57]  ABSTRACT

In an approach to reducing delays resulting from resolution of conditional branch instructions, such instructions are pre-executed in a coprocessor which precedes a pipeline processor and prepared an instruction stream for input to the pipeline processor. Because of this pre-execution, the input instruction stream has fewer conditional branches for the pipeline processor to resolve. Also, the coprocessor may handle address generation interlock situations which also cause execution delays in the pipeline processor.

18 Claims, 12 Drawing Sheets

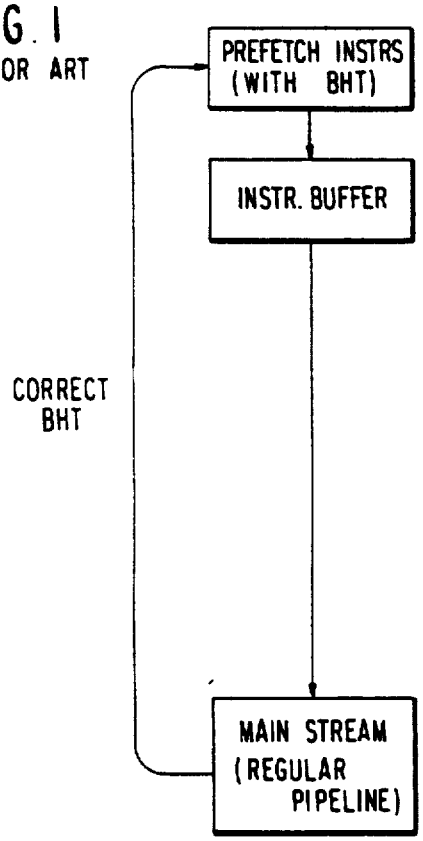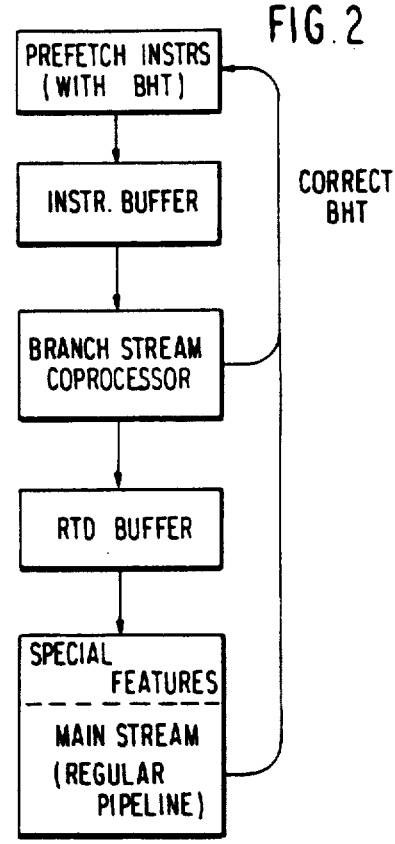

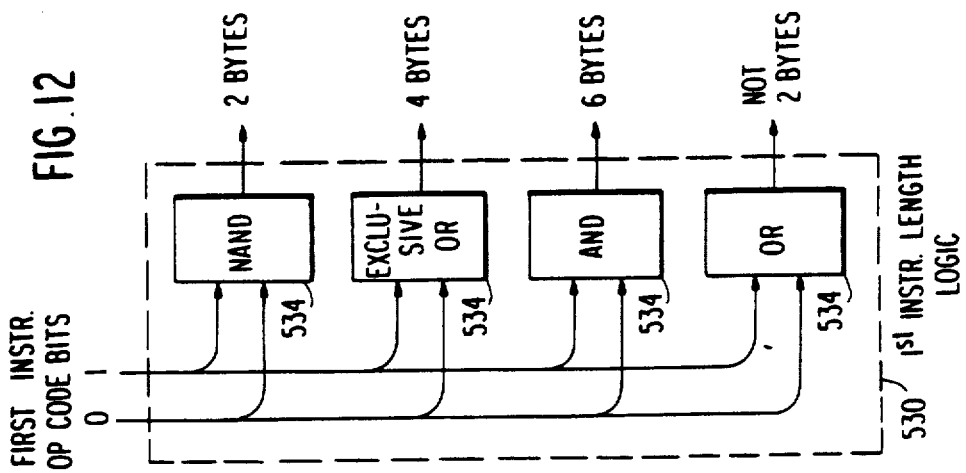
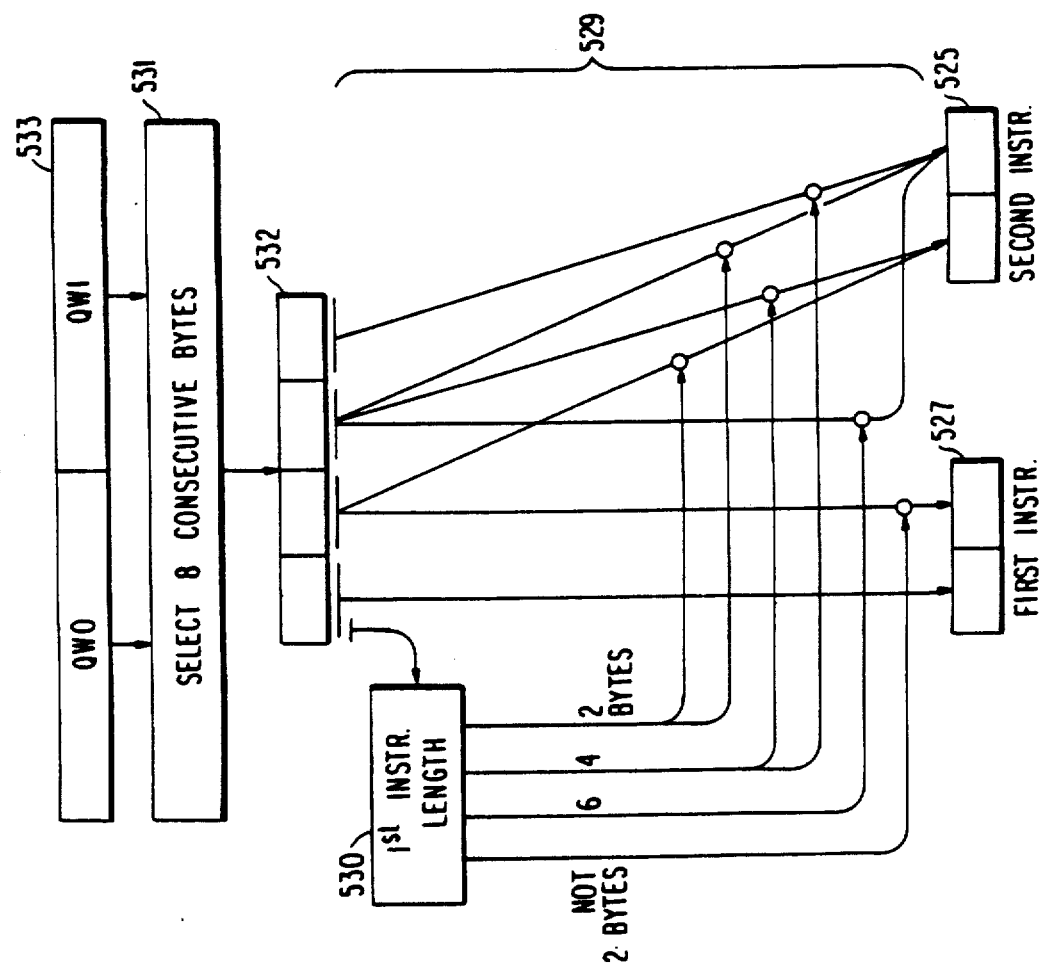

FIG.14 CC VALID/INVALID LOGIC

PIPELINE PROCESSING APPARATUS FOR EXECUTING INSTRUCTIONS IN THREE STREAMS, INCLUDING BRANCH STREAM PRE-EXECUTION PROCESSOR FOR PRE-EXECUTING CONDITIONAL BRANCH INSTRUCTIONS

DESCRIPTION

Technical Field

The invention relates to resolution of branch instructions in computer-executable instruction streams. In particular, the invention relates to early resolution of conditional branches in order to reduce delays in execution of a stream of instructions. The invention also is intended to prevent delays created by the sharing of registers by consecutive instructions in an instruction sequence.

Prior Art

Most widely used computer architectures, including the IBM System 370 architecture, are based on a sequential model of program execution, wherein each instruction of the program is fetched from memory, fully executed, and all results returned to memory before the next instruction could be fetched from memory. The model also specifies that the next instruction usually is the next instruction immediately following, in ascending address sequence, except that certain instructions, called branches, may provide a specific location in memory, different from the next higher address, from where the next instruction should be fetched. This specific location is called the branch target; a branch is said to be "taken" when the target instruction is the next one executed after the branch.

Branches may be unconditional, that is, always taken, or conditional, that is, taken only if a condition (in IBM System 370 architecture, the condition code) set by a previous instruction is a specified value. When a conditional branch is not taken, the next instruction fetched and executed is the next one in the sequence.

Most early computers not only followed this sequential model but also were sequential in operation, so that branch instructions caused no particular difficulty. If a branch was encountered, the computer merely executed the instruction and went to the appropriate location in memory, according to the execution result, to fetch the next instruction. This delay was acceptable when computers functioned more slowly, taking a greater number of machine cycles to fetch and execute an instruction. The number of cycles of delay caused by a taken branch was not significant by comparison.

In a number of more recent machines, instruction fetches and instruction executions have been overlapped. While one instruction is being carried out, the next one, or one farther down in sequence, is being fetched from memory. When no branches are encountered, overlapping works satisfactorily. However, if a branch is encountered and taken, this overlapping fetch/execution approach causes incorrect instructions to be fetched into the execution sequence. Even so, the presence of an incorrect instruction does not turn out to be much of a problem, as an executed branch instruction would result in another fetch for the target instruction, which then would be substituted for the overlapped fetch. While precious machine cycles would be lost, for less significant overlapping techniques, such as two-step overlaps, the loss is not unbearable.

As processing speed has increased, so has the degree of overlap, so that the number of fetches and executions per machine cycle has increased. Consequently, while the number of machine cycles of delay caused by taken branches has not increased, the magnitude of the delay in proportion to required execution time has increased dramatically.

High performance processors such as the IBM 3033 and 3090, which employ a "pipeline" approach to executing instructions, as will be discussed below, require very large memories. The amount of time required to access these large memories is substantially greater than the cycle time of the processors. As a result, if direct memory access were employed, processor speed would be wasted.

Consequently, in order to take advantage of high processor speed, the technique of employing smaller memories (called caches) was developed. These cache memories are substantially smaller than the processor memories, and require correspondingly shorter access time, generally on the order of two machine cycles. The caches hold data and instructions most recently used by the processor; experience has shown that these data and instructions are what the processor is most likely to use in the immediate future, during execution of a given program.

With the use of cache memory enabling a significant reduction in required memory access time, it has been possible to process the vast majority of program instructions in four or five steps, as follows:

1) Fetch the instruction from the cache.
2) Decode the instruction, reading general purpose registers designated for base and index values (operands).
3) Address generation: generate an effective address by adding the base, index, and displacement values.
4) Access cache using the generated effective address (if the decoded instruction requires an operand to be fetched from memory. Cache access generally takes two machine cycles, but may take only one, if the necessary operand or operands are stored in registers rather than in the cache.)
5) Execute the instruction (for most instructions, execution takes one machine cycle).

Generally, separate facilities are provided for each step, and each step usually requires only one basic machine cycle, so that the steps required to execute one instruction can be overlapped with the steps required for execution of three or four other instructions, with the steps in execution of those instructions being offset by one cycle. This pipeline design makes it possible theoretically to execute instructions at the rate of one per machine cycle, where several short machine cycles are required to process an instruction completely. Again, this theoretical rate is achievable only if proper instructions are fetched into the program sequence. However, because of the nature of programs, such a rate is maintainable only for brief spurts.

As before, the fetching of instructions for the pipeline is overlapped with the pipeline operation described above. Typically, buffers are provided which are capable of holding several instructions, so that the instructions can be fed immediately into the pipeline when needed. Accordingly, instructions are pre-fetched into the buffer as far ahead of their intended execution as buffer size permits.

A major reason that the above-mentioned theoretical rate is maintainable only for short periods is the disruption caused by branches. Branches cause two main types of delay. One is the delay inherent in decoding the instruction following the branch. Of course, if the branch is not taken, there will not be any delay in the pipeline execution, because the next instruction already would have been prefetched, and would be executed as part of the normal sequence. However, if an untaken branch is conditional, even if the next instruction is available from the instruction buffer, it cannot be processed with certainty until the branch instruction has been executed (e.g. step 4 above). For processors with, for example, a two cycle cache access for instructions, there is a two-cycle delay before the next instruction can be decoded. If the branch is taken, then the branch target must be fetched and decoded. The delay for taken branches typically is three machine cycles. Since branches typically comprise one-fourth of all instructions, and taken branches comprise one-sixth of all instructions, these delays are a significant impediment to maintaining the theoretical execution rate.

The second type of delay caused by branches arises because of cache access contention. Most processors have one cache which can handle one cache access per cycle, during which data may be fetched, instructions may be fetched, or data may be stored. While the cache may be needed for one, two, or even three of these operations, clearly only one of these operations may be performed in any one cycle; the others must be deferred. In order to determine how the deferral should be carried out, some sort of priority scheme is needed. Data fetches are given first priority, as delaying data fetches always will delay instruction completion, whereas data stores and instruction fetches do not necessarily cause delay.

Instruction fetches can be deferred without penalty if the processor has an instruction buffer, and the buffer is not empty. If the buffer becomes empty, as when instruction fetches are deferred too often, then there is a delay while the next instruction is fetched. Data stores can be deferred, though at some cost in program control complexity. All fetches, both of data and of instructions, occurring after a deferred store must be checked to see whether they would have been affected had the store not been deferred. If there would have been some effect, corrective action must be taken. Generally, then, data stores are given second priority, and instruction fetches are given the lowest priority.

The result of all this priority assignment is that, if a processor were to be operated at one instruction per cycle according to the above cache access priorities, instructions could be fetched in only about one cache access in ten. Such a frequency is insufficient to maintain the theoretical instruction execution rate.

Both this instruction supply problem and the above-discussed branch delay problem have been addressed in different ways. Unfortunately, solutions to either of the problems tend to exacerbate the other problem.

One approach to the branch problem is to suspend further instruction decoding until it is decided whether the branch is to be taken. This approach would appear to be reasonable, particularly in view of the instruction supply problem, to ensure that no unnecessary instruction fetching is performed. With this solution, no instruction would be fetched beyond a branch. A five-cycle delay would result: the branch resolution, as discussed above, would take three cycles; and the instruction fetching, also as discussed above, would take two cycles. Since one-fourth of all instructions are branches, the additional delay resulting from this approach would be 1.25 cycles per instruction, which is quite a large penalty for a machine intended to operate at a rate of one cycle per instruction.

In some processors, instead of suspending further instruction decoding pending branch resolution, guesses are made as to whether an encountered branch will be taken. Of course, unconditional branches always are guessed to be taken. Statistically, conditional branches have been found to be taken only about 40% of the time. Consequently, conditional branches are guessed to be not taken, with decoding of the next sequential instructions occurring in a "conditional" mode. In this mode, operands are fetched, but registers and memory are not updated until it is determined that the branch indeed has not been taken. Generally, branches are resolved about three cycles after they are decoded, so that three instructions following a branch are handled in this conditional mode.

Under this second approach, if the guess is correct, that is, if the branch is not taken, the instructions handled in conditional mode are released, and execution of these instructions is permitted to continue. No time is lost. However, if the guess is incorrect, the conditional instructions are discarded, along with any operands which might have been fetched. As a result, the three cycles it took to decode these conditional instructions are lost; of course, since branches are taken about 40% of the time, incorrect predictions (and hence lost cycles) will occur with corresponding frequency. Also, it should be noted that, according to one of the techniques employed in the prior art, amounting to a sort of "hedge fetch," cycles are not lost because of excessive cache accesses. In this prior art approach, which will be discussed in greater detail below, one or more extra instruction buffers are employed, and instructions corresponding to the branch target address as well as the next sequential address are fetched into respective buffers; the appropriate buffer is selected, depending on the outcome of the conditional branch. In any event, when this second approach is employed, no delay results from required revocation of the wrong guess, so that overall branch delay clearly is reduced.

Solving the instruction supply problem is more difficult than solving the branch delay problem. As described above, some processors employ more than one instruction buffer, so that a fetch may be executed for the branch target, even though the branch is guessed not to be taken. Using more than one instruction buffer saves time only if the branch is taken; otherwise, the extra fetch (the "hedge fetch") is wasted. Whatever the outcome, instructions are sent alternately to the multiple instruction buffers until the branch is resolved, so that instructions are ready for execution.

However, because branches occur so often, many valuable instruction fetching opportunities are wasted. Loss of these opportunities causes appreciable delay, because the instruction buffer is empty more often.

Also, it should be noted that, when conditional mode instructions include a second branch instruction, further conditional activity must stop since, if only two instruction buffers are used, there is no buffer for the second branch target. The solution set forth in U.S. Pat. No. 4,200,927 was to put a third buffer in a subsequent machine.

If a better guess could be made as to whether a branch would be taken or not, the number of lost cycles caused by the instruction supply problem could be decreased. As a general rule, it has been found that, for individually-considered conditional branches, if a conditional branch is taken once, it will be taken subsequently. Conversely, if it is not taken the first time, then it is probable that it will not be taken in subsequent executions. Accordingly, it would seem to make sense to keep some sort of record of actions taken when branches first are encountered. Then, the record can be consulted, and the action taken in that instance repeated, as a guess. Statistically, this guess will be more accurate than the fixed guess described above.

The above approach is described in greater detail v in U.S. Pat. No. 4,477,872. Briefly, the record would be kept in a hardware table, called a decode history table, having, for example, 1024 one-bit entries. An entry would be selected by a 10-bit address. Whenever a branch is decoded (step 1 in the sequence described above), the branch address is hashed to 10 bits; hashing is necessary because the branch address is much longer than 10 bits. The selected one-bit entry provides the take/not take action of the branch the last time it was encountered. If the actual action changes (i.e., the table provides an incorrect outcome), the entry also would be changed. This table is called a decode history table because it is consulted when the branch is to be decoded. With the help of this table, guesses are more accurate, so that instruction fetches are less often wasted. Although the hashing may cause two or more branches to be represented in the same hashed entry, the errors resulting from hashing usually are fewer in number than those resulting from incorrect guesses.

The decode history table is not useful in solving the branch delay problem, because the branch target 5 must be obtained, even after the proper decoding takes place. The target address must be generated, and the target fetched. This delay can be reduced considerably by means of a branch history table, which records the target addresses of the taken branches. This approach is disclosed in U.S. Pat. No. 3,559,183.

A branch history table may have 1024 entries (or more), each entry being the full target address of a taken branch, along with the corresponding branch address. The branch history table is accessed at instruction prefetch time (prior to instruction decoding). Since instructions generally are prefetched eight bytes at a time, branch history table entries are made on a doubleword (eight-byte) basis, so that, if a given doubleword contains a taken branch, then the doubleword address is used to select a branch history table entry. This entry, naturally, will include both the branch address and the corresponding target address. If the doubleword does not contain a taken branch, there is no entry in the branch history table.

From the above discussion, it is clear that the branch history table may save time in two ways. First, the branch history table guides instruction prefetching, so that the instruction buffer may be filled correctly. The branch history table is accessed for each prefetched doubleword. If there is a corresponding entry in the branch history table, the target address contained therein is used to identify the next doubleword to be prefetched. If there is no corresponding entry, the next doubleword in sequence is prefetched. This procedure may be carried out for a number of consecutive branches, so that decoding need not be suspended. However, as the number of encountered branches increases, there is a heightened risk that one of the branch history table predictions is incorrect, in which case the subsequent prefetches are wasted.

Second, the branch history table provides for the selection of the next instruction to be decoded. Consequently, when the branch history table is correct, there is no branch delay. Of course, the predicted target must be compared with the actual target after decoding, and the predicted action must be compared with the actual action after execution. If either of these is incorrect, corrective action must be taken, and the branch history table entry must be updated. Unfortunately, the branch history table is wrong between 10% and 20% of the time, so that branch delay still can be appreciable. Copending U.S. Pat. Application Ser. No. 728,424, U.S. Pat. No. 4,579,141 filed Apr. 29, 1985 and commonly assigned with the present application, provides a more complete description of the branch history table. That description is hereby incorporated by reference into the present application.

One of the problems with updating the branch history table in accordance with this prior art approach is that the updating is delayed until after an instruction is executed. This delay occurs because prefetched instructions are put into an instruction buffer which provides instructions for input into the main stream pipeline. If the branch history table causes an incorrect guess to be made, some incorrect instructions will be prefetched, but the error will not be detected until the branch actually is resolved in the main stream. Only then can the branch history table be corrected, and the correct instruction fetched. Thus, several machine cycles may be lost. A flow diagram depicting this post-execution correction is shown in FIG. 1.

From the foregoing discussion, it is clear that it is desirable to update the branch history table as soon as possible after an error in the branch history table is detected, preferably before instruction execution.

Yet another source of processing delay arises when one instruction in an instruction sequence puts a new value into a register and a second, immediately-following instruction uses the same register as the base register. Such a situation can occur because there is little difference in required time between register access and cache access, so that programmers often access registers and cache memories in interchangeable fashion. As a result, the above register-sharing situation occurs because only a limited number of registers usually are employed by programmers when constructing compilers, assembly-language programs, and the like.

In any event, because of this register sharing, an address for the second instruction cannot be generated in the above situation until the first instruction has been executed. Failure to anticipate such situations, which may be called address generation interlock, causes further delay in instruction execution, as the processor has to wait for the new value of the base register to come from the cache before executing the next instruction. Resolution of this situation requires an examination of the relationship among consecutive instructions. Previous processors have not performed this examination.

SUMMARY OF THE INVENTION

It is an object of the present invention to resolve branches as early as possible before instructions need to be prefetched into an instruction buffer.

It is another object of the invention to handle branch delays, to the greatest extent possible, before instructions are fed to the main stream pipeline to be executed.

It is yet another object of the invention to keep the instruction buffer as full as possible, in order to minimize the instruction supply problem.

Still another object of the invention is to anticipate address generation interlock situations whenever possible, and to resolve them.

In accordance with the present invention, branch resolution problems are handled during the instruction prefetching process, rather than during main stream instruction execution. Instructions are prefetched from memory under control of a branch history table, and are placed in an instruction buffer. It is possible that the buffer will contain an incorrect sequence of instructions, because of branch history table errors. However, instead of feeding into the main stream pipeline, the instruction buffer feeds instructions two at a time into a branch stream coprocessor, which looks for branches and resolves them whenever possible.

When a branch is encountered, the branch stream coprocessor pre-executes it, along with the condition code setting instruction which usually immediately precedes it. The comparison between actual actions and targets and predicted actions and targets takes place before instructions are fed into the main stream pipeline. If necessary, the branch history table will be corrected. Correction takes place in this branch stream, rather than in the main stream, so that branch delays during instruction execution are reduced. Also, because the branch stream coprocessor scans instructions two at a time, the coprocessor will tend to stay sufficiently ahead of a main stream processor which actually executes the instructions.

Once instructions are confirmed in the branch stream, they are sent to a ready-to-decode buffer, which then feeds the main stream pipeline in a manner similar to the feeding of the main stream by the instruction buffer in the prior art. Because whatever branches can be resolved are resolved by the branch stream coprocessor, the ready-to-decode buffer contains fewer branch errors. However, it may contain some undecoded branches if some of the encountered branches were unresolvable prior to actual instruction execution. In any event, the branch stream coprocessor will tend to keep the ready-to-decode buffer full because of the two instruction scans per cycle mode of operation, and because it is executing only a portion of all instructions. Further, the branch stream coprocessor does not fully execute branches. It is the main stream processor which completely executes instructions, to the extent of actually changing the state of the machine, altering addresses, and the like.

The branch stream coprocessor will encounter branch delays when there are errors in the branch history table. However, because instructions are scanned two at a time, the ready-to-decode buffer will tend to remain full, unless several consecutive branch history table errors are encountered.

In accordance with a preferred embodiment of the invention, the branch stream coprocessor may anticipate possible address generation interlock situations by treating certain types of instructions as possible causes of address generation interlock. The relationship among consecutive ones of these certain types of instructions is examined. The main stream processor is alerted to these situations, and selects the proper base value for the subsequent instruction.

BRIEF DESCRIPTION OF THE DRAWINGS

FIG. 1 is a chart of processing flow for correcting a branch history table in a conventional processor.

FIG. 2 is a chart of processing flow for correcting a branch history table in a processing system according to a preferred embodiment of the invention.

FIG. 4 is a chart showing the configuration of a branch history table directory and array.

FIG. 11 is a diagram showing in greater detail some of the elements shown in FIGS. 9 and 10.

FIG. 12 is a diagram showing in greater detail the partial decoder of FIG. 11.

FIG. 14 is a chart showing the procedure for verifying condition codes set by the branch stream coprocessor.

DETAILED DESCRIPTION OF THE PREFERRED EMBODIMENT OF THE INVENTION

In IBM System 370 architecture, instructions may be 2, 4, or 6 bytes long, with four bytes being generally considered to be the average length. Because instructions are stored sequentially, and because instruction-fetching cache accesses are limited, it is desirable to fetch as many instructions at a time as possible.

Generally, eight or 16 bytes per fetch are provided. However, a larger number of bytes per fetch would be preferable. Since an average of approximately one of every six instructions results in a taken branch, an average group of instructions would start with a target instruction of a preceding taken branch, and would include five more instructions, the last of which is another taken branch. Such a group would have $6 \times 4 = 24$ bytes. Consequently, an instruction fetch of 24 bytes would suffice to bring in this group.

However, because this one-in-six figure is an average, there may be fewer than five instructions between cOnsecutive taken branches, or there may be more than five. If there are fewer, then clearly a 24 byte instruction fetch would suffice. However, if there are more than five instructions between consecutive taken branches, then 24 bytes will not be enough.

Also, it should be considered that fetches generally are made to fixed subdivisions of memory (e.g. 8, 16, 32, or 64 byte boundaries), whereas branch targets may be in any two-byte (halfword) interval; on the average, the branch target will be in the middle of the subdivision. For example, in a 64 byte instruction fetch, the average yield of useful instructions would be 32 bytes, which would include the average (i.e. 24 byte) group of instructions. Consequently, in the described embodiment, a 64 byte fetch is used.

The 64 byte fetch refers only to what the cache should provide in a given access. It would suffice to load an instruction buffer from a cache, via an intermediate buffer, in four successive cycles, 16 bytes (a quadword) being transferred in each cycle. This alternative approach is described more fully in copending U.S. Pat. Application Ser. No. 626,089, now U.S. Pat. No. 4,823,259 filed June 29, 1984, and commonly assigned with the present application. That disclosure also is hereby incorporated by reference into the present application.

Figure 3:
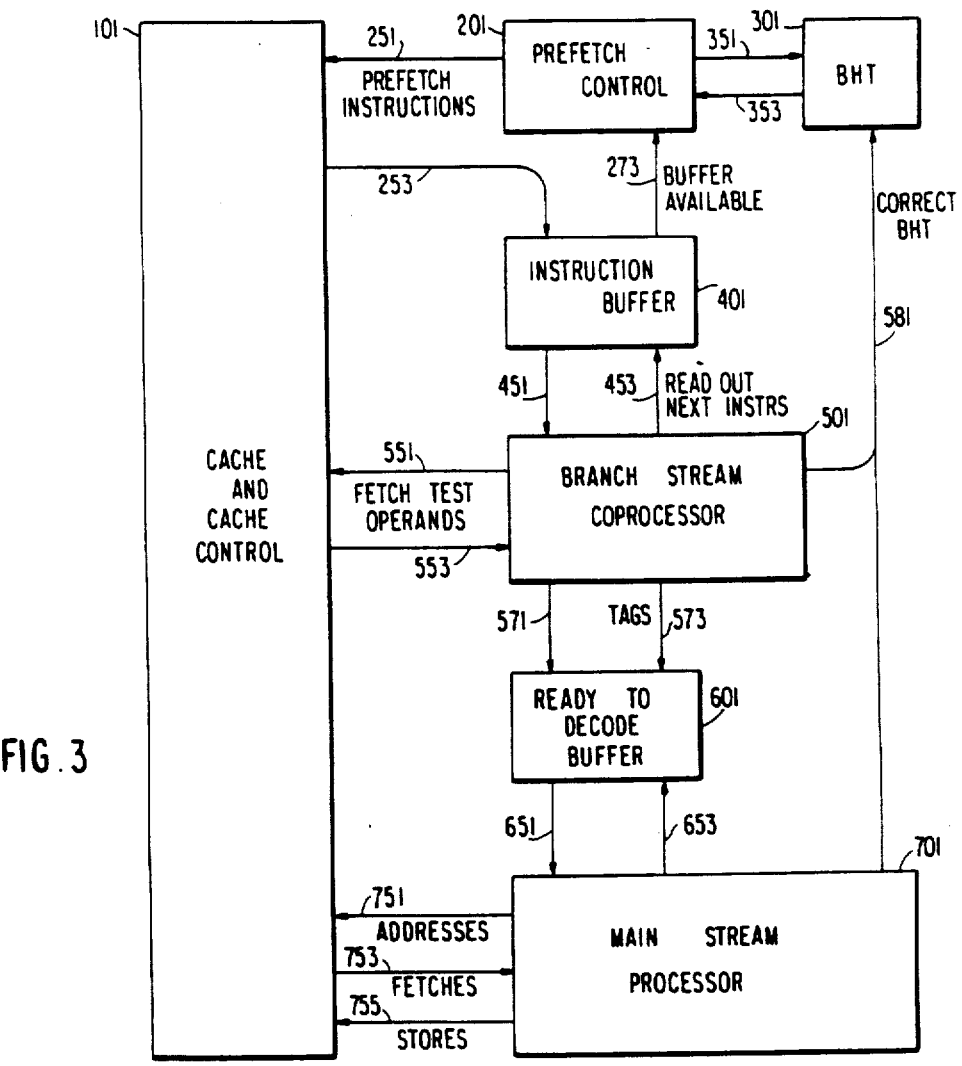
FIG. 3 is a block diagram of a processing system according to the present invention.

Referring to FIG. 3, an overview of the operation of a branch stream coprocessor as implemented in a processing system in accordance with the present invention will be described. Later, each of the main elements will be described in detail.

Prefetching into an instruction buffer 401 is guided by a branch history table 301, in order to make the best use of instruction prefetch opportunities, and to reduce the branch delays seen by a branch stream coprocessor 501.

A prefetch control 201 and the branch history table (BHT) 301 are connected via a path 351, which transmits accesses from the prefetch control 201, and a path 353, which returns branch history table outputs. When the branch history table 301 needs correction, as determined by the branch stream coprocessor 501 during partial execution of conditional branch instructions, such correction is transmitted from the branch stream coprocessor 501 to the branch history table 301 via a path 581.

Instructions are instructed to be prefetched by the prefetch control 201 via a line 251 to a cache 101 in 64 byte blocks, and are transferred from the cache 101 in 64 byte blocks via a path 253 in four cycles (16 bytes/cycle) to the instruction buffer 401. Of course, while 64 byte block cache accesses result in more efficient operation, if design considerations so warrant, 16 byte block accesses would be acceptable.

Also, as would be appreciated by the ordinarily skilled artisan, a separate instruction cache could be provided which would not handle data fetches and stores, but which simply would provide four main memory accesses of a quadword (16 bytes) each, to yield the same instruction supply rate. However, such a split cache is not necessary for the construction of the embodiment being described.

The instruction buffer 401 outputs instructions to the branch stream coprocessor 501 via a path 451, in response to signals from the branch stream coprocessor 501 over a line 453 to read out the next instructions from the instruction buffer 401. The instruction buffer 401 also outputs a signal over a line 273 to the prefetch control 201 when there is room to accommodate more instructions.

In order to pre-execute instructions received two at a time from the instruction buffer 401, the branch stream coprocessor 501 fetches corresponding test operands, when appropriate, from the cache 101 over a line 551.

The operands are sent from the cache over a line 553. It should be noted that the branch stream coprocessor 501 will not pre-execute all instructions, but only those which require some action before being executed by a main stream processor 701. Other instructions pass directly to a ready-to-decode buffer 601. Because instructions which are pre-executed are delayed before passage to the ready-to-decode buffer 601, a count is kept in the coprocessor, so that pre-executed instructions occupy the appropriate place in the ready-to-decode buffer 601.

All instructions pass from the branch stream coprocessor 501 over a line 571 to the ready-to-decode buffer 601. Those instructions which have been pre-executed will be accompanied by additional bits, output over a line 573, which indicate to the main stream processor 701 what has been done, and what remains to be done. If the branch stream coprocessor 501 detects an error in the branch history table 301, a correction is output over a line 581 to the branch history table 301.

The ready-to-decode buffer 601 holds all instructions, in proper sequence, for execution by the main stream processor 701. The main stream processor 701 functions substantially as a conventional pipeline processor, such as an IBM 3033 or 3090, except that it acts also in accordance with the information contained in a number of tags which are output over the line 573 to the ready-to-decode buffer 601. Requests for instructions pass to the ready-to-decode buffer 601 over a line 653, and instructions are output over a line 651 to the main stream processor 701.

The main stream processor 701 addresses the cache 101 over a line 751, and receives fetched information over a line 753. Output is stored in the cache via a path 755. If the main stream processor 701 is required to resolve a branch which the branch stream coprocessor 501 was unable to handle and correction of the branch history table 301 is required as a result, correction is output over a line 581 to the branch history table 301.

Now, a more detailed description of the elements of the invention follows.

The branch history table 301 is configured for access of quadword instruction blocks, and contains entries for such blocks which contain at least one instruction which has resulted in a taken branch. There may be more than one taken branch per entry; the branch history table permits four taken branches per entry.

The branch history table directory and array themselves are shown in FIG. 4. The addresses of quadwords being prefetched by prefetch control 201 are supplied to a branch history table directory 03 via path 351. Either one or none of the addresses in the directory will match the supplied address. If there is a match, the corresponding block entry in an array 305 will issue via path 53 to the prefetch control 201. If there is no match, a "MISS" indication will issue over that path. For example, suppose the quadword address on path 351 is "X". This would be matched by an entry 307 in the directory, and a corresponding block entry 309 would issue on path 353.

Figure 5:
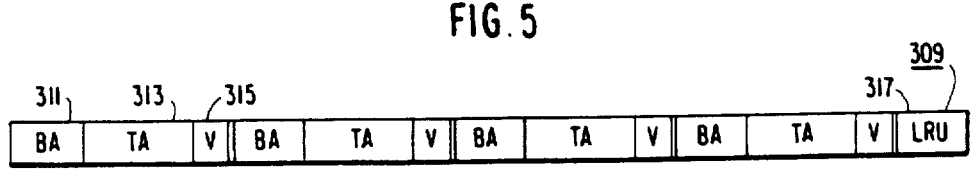
FIG. 5 is a diagram showing the format of a block entry in a branch history table.

The block entry format, shown in FIG. 5, contains four sub-entries for the taken branches which may be in the instruction quadword represented by the block entry. (Recall that a single branch history table entry may contain up to four taken branches.) Each sub-entry has three fields. A field BA 311 denotes the location of the branch within the quadword; a field TA 313 denotes the target address of the branch; and a field V 315 is a validity bit which denotes whether a BA/TA pair is valid.

The validity bit is necessary because a given quadword may contain fewer than four taken branches.

If there are four valid sub-entries, and a fifth is to be added, one of the existing subentries, the least recently used sub-entry, is removed to make room for the new one. The status of the least recently used sub-entry is kept in some LRU (for least recently used) bits in a field 317. Replacement of entries in this fashion, that is, based on the LRU bits or on an approximation thereof, is well known in cache memory design.

Figure 6:
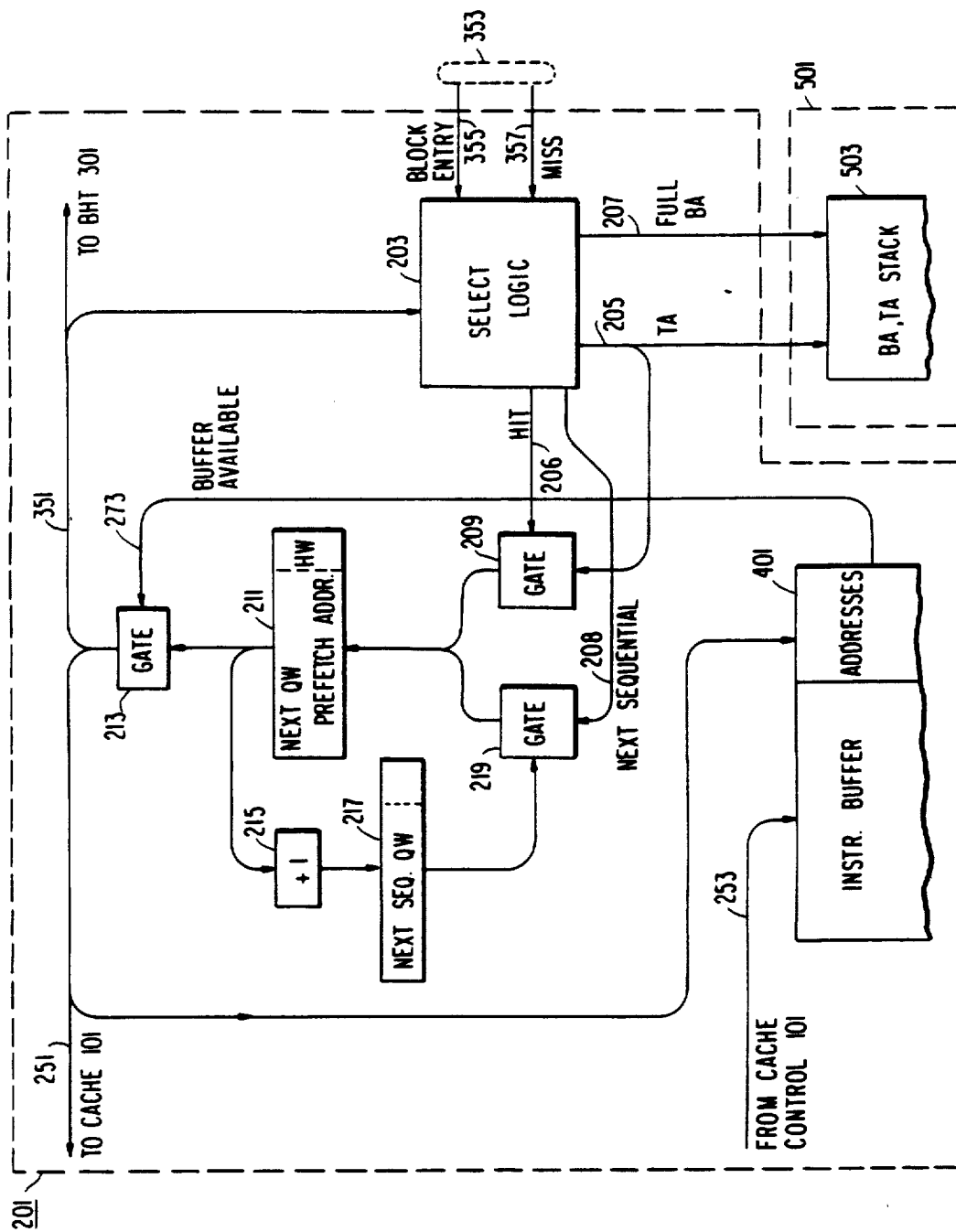
FIG. 6 is a more detailed diagram of the prefetch control shown in FIG. 3.

FIG. 6 is a diagram of the prefetch control 201, which keeps the instruction buffer 401 filled with the most likely next instructions, in accordance with the guidance provided by the branch history table 301. Prefetching is performed on an instruction quadword basis. A next quadword address register 211 contains the address of the next quadword to be prefetched. If there is free space in the instruction buffer 401, a signal will be generated from the instruction buffer 401 along line 273 to so indicate; if so indicated, a prefetch should be initiated. The signal along line 73 enables a buffer available gate 213 to send the next quadword prefetch address to the cache 101 along path 251, and to the branch history table 301 on path 351. As previously described, the branch history table 301 will return information, if any, on taken branches in this prefetched quadword.

Figure 7:
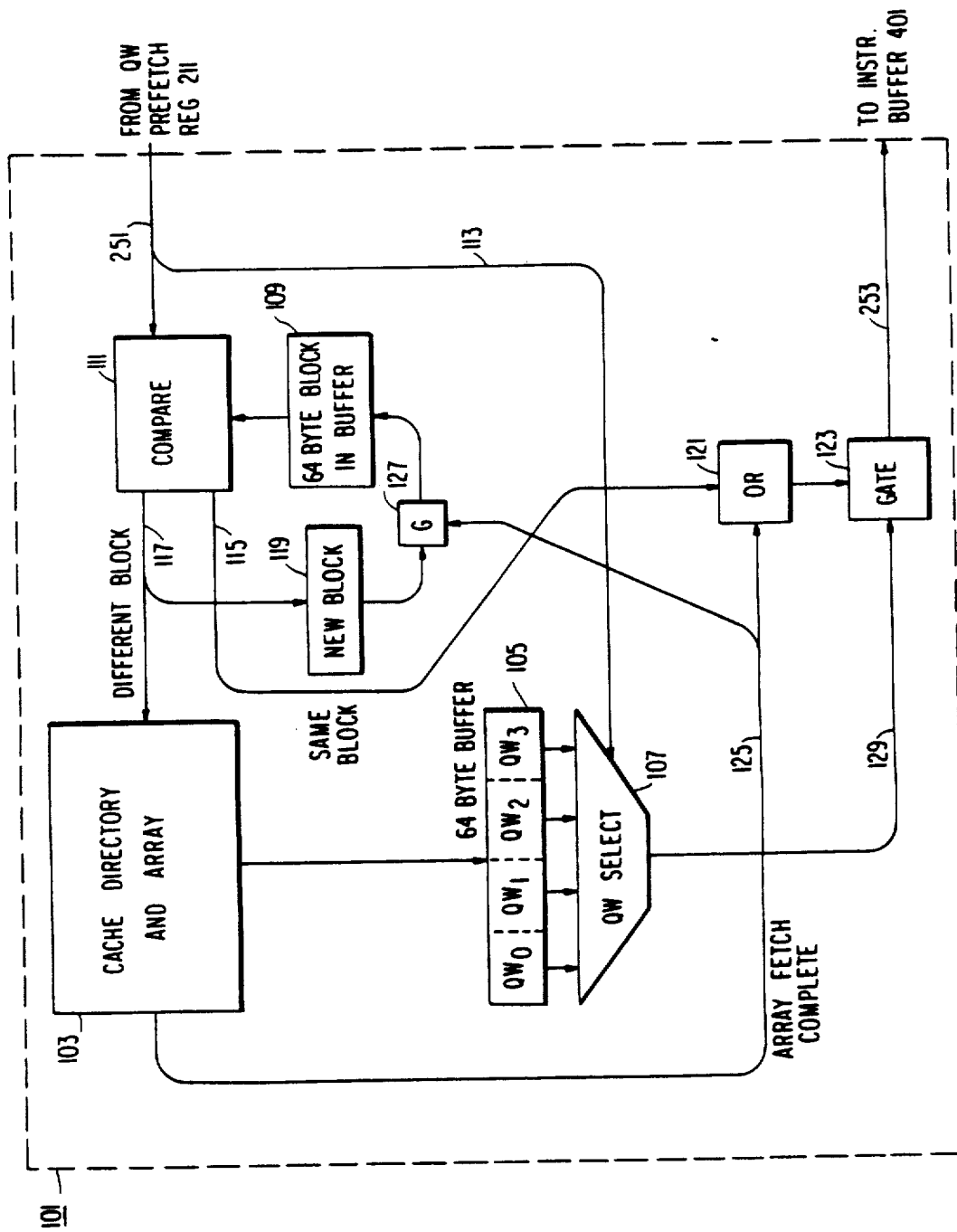
FIG. 7 is a more detailed diagram showing a portion of the cache and cache control shown in FIG. 3.

The operation of the cache and cache control 101 is shown in FIG. 7. The quadword being requested may come either from a 64 byte block previously transferred from a cache array 103 into a 64 byte output buffer 105, or it may come from a different block which must be fetched from the cache array 103 into the output buffer 105. The choice is made by a compare unit 111, which compares the address of the block currently in the output buffer 105 as stored in an address register 109 with the incoming quadword address on path 251. If the request is to a different block, the compare unit 111 signals the new block request on a path 117, and issues an access signal to the cache directory and array 103, subject, of course, to previously set cache access priorities, which have been described above. The requested block will be read from the cache array 103 into the output buffer 105. Meanwhile, the new block address, sent along path 117, will have been put into a new block address register 119. When the array fetch is complete, a signal along a line 125 will so indicate, and the new block address in the new block address register 119 will be transferred through an enabling gate 127 into the address register 109 to identify the block now in the output buffer 105.

At this point (or if the quadword request was to the block currently in the output buffer 105), some select gates 107 select the particular quadword, using two low order bits 113 of the quadword address, generated in the prefetch control 201 and currently on line 251 (FIG. 6). The selected quadword is read out, via a path 129, into a gate 123. This gate 123 is enabled when the current quadword request is to the same block signalled on a line 115 from the compare unit 111, or when the signal on a line 125 from the cache directory and array 103 indicates that an array fetch has been completed. These signals on lines 115 and 125 pass as inputs to OR gate 121, whose output enables gate 123 to issue the requested quadword via path 253 to the instruction buffer 401.

Prefetching continues, with additional quadwords being fed into the instruction buffer 401 until it is full, and thereafter whenever there is available space. As shown in FIG. 6, the additional quadwords may be either the next sequential or branch target quadwords, depending on what is output from the branch history table 301. If the most recently fetched quadword contains one or more taken branches, it is likely that there will be a corresponding entry in the branch history table. This entry will be returned via a path 355 to select logic 203, which uses the halfword (halfword —low order 3 bits) of the address on a path 351 to select the sub-entry for the first taken branch, if any, after the entry point into the new quadword. If there is such an entry, and if it is valid, the contents of the TA field 313 of the sub-entry will issue via a path 205, and will be applied to enabling gate 209, and also to a BA/TA stack 503 in the branch stream coprocessor 501. A "HIT" signal 206 applied to gate 209 causes the contents of the TA field 313 to be put into the next quadword address register 211. The contents of the BA field 311 (3 bits) are appended to the quadword address supplied on path 351 to make a full branch address, which issues via a path 207 to the BA/TA stack 503.

If there is no taken branch after the entry point in the new quadword, or if there was a "MISS" signal from the branch history table 301 via a line 357, the select logic 203 activates the next sequential line 208 to enable another gate 219, in order to move the next sequential quadword address from a next sequential quadword address register 217 to a next quadword prefetch address register 211. It should be noted that the entry point for the next sequential quadword is at the beginning of the quadword; hence, the three low order bits in the next sequential quadword address register 217 are zeroes. The next sequential quadword address in the next sequential quadword address register 217 is obtained by adding one (via add one logic 215) to the quadword address in next quadword prefetch address register 211.

Figure 8:
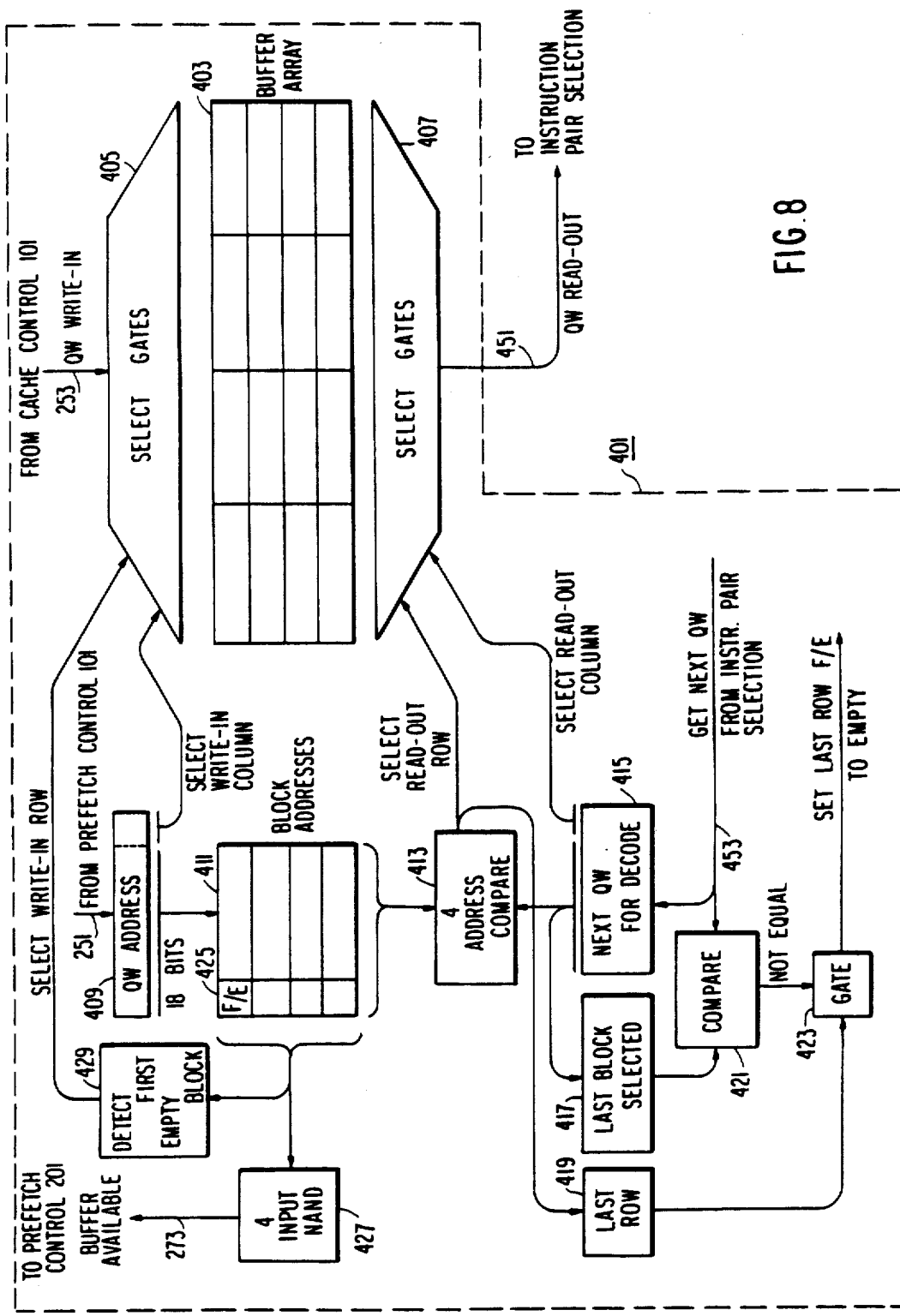
FIG. 8 is a more detailed diagram of the instruction buffer shown in FIG. 3.

Referring now to FIG. 8, the operation of the instruction buffer 401 will be described, for the case in which 64 byte blocks are being transferred, one quadword at a time. As shown in the Figure, a buffer array 403 consists of four 64 byte blocks, each divided into four quadwords. The addresses of the four blocks in the buffer array 403 are held in a block address register 411. A quadword prefetched from the cache 101 and output along the path 253 is written into a particular row (block) and column (quadword) in the buffer array 403, via select gates 405. In turn, a quadword to be read out on a path 451 to an instruction pair selection section (FIG. 9) is selected from a particular row and column via select gates 407.

Each of the blocks in the buffer array 403 also has an associated F/E bit 425 signifying whether the block is full or empty. If all the blocks are full, logic circuitry 427, which may be a four-input NAND gate, outputs a signal via line 273 to the prefetch control 201, indicating that no block is available, i.e., that the instruction buffer 401 is full. However, if one of the blocks is empty, the logic circuitry 427 outputs a signal over that line 273, indicating that another quadword may be fed into the buffer array 403. The address of the prefetched quadword is supplied to the instruction buffer 401 via path 251, and the quadword itself is supplied to the buffer array 403 via line 253.

Path 251 from the prefetch control 201 leads into quadword address register 409, which holds a quadword address. The block address portion transmitted over path 251 is put in the first empty block address in the block address register 411, as determined by logic circuitry 429 operating on the F/E bits 425. In accordance with this first empty block address, the quadword will be written into a row of the buffer array 403, with the column being selected by the low order two bits of the quadword address. Subsequent quadwords prefetched from the same block in the output buffer 105 (see FIG. 7) will be written into the same row, but into different (subsequent) columns. It is possible that not all columns in a given row will be filled, depending on the sequence of addresses output by the prefetch control 201.

Block changes also must be detected, as prefetching must wait after a block change until more buffer space becomes available. Of course, prefetches can continue, so long as they are for quadwords from the same block. Logic circuitry for making this determination may be similar to that which will be described below for providing buffer read-out.

Referring again to FIG. 8, quadwords are withdrawn from the buffer array 403, and are transmitted as instructions for the branch stream coprocessor 501 via instruction pair selection logic (shown in FIG. 9), which issues quadword requests on line 453. The address of the next quadword to be decoded is sent to a next decoded quadword register 415, and the block portion of the address is supplied to a compare unit 413. This block portion is compared with the four block addresses contained in the block address register 411, these addresses denoting blocks currently in the buffer array 403. One of the block addresses will compare equal, though perhaps not immediately, and the corresponding row is selected for read-out. The low order two bits of the quadword address select the read-out column, as described above. The address of the selected block also is put into a last block selected register 417 as the last block selected, and the selected row number (again, the low order two bits) is put in a last row register 419 as the last row selected.

The next quadword address issuing on path 453 from the instruction pair selection logic then is compared with the contents of the last block selected register 417 by a compare unit 421 to see if the new request is to a different block than was the last request. (It should be noted that this same sort of logic circuitry would be applicable to determining when a buffer next becomes available.) If a new block is being accessed, the last block in buffer array 403 no longer is needed, and so gate 423 can be set to indicate that the last row of the buffer array 403 is empty. Now, the prefetch control 201 can prefetch additional quadwords into the newly emptied block. In this manner, the buffer can be kept filled with instructions ahead of those being withdrawn for the branch stream coprocessor 501. (As will be described below, a key feature of the invention is that the quadwords to be fed into instruction buffer 401 are selected two at a time for decoding by the branch stream coprocessor 501, so that the branch stream coprocessor 501 can keep ahead of the main stream processor 701.)

Now, the operation of the branch stream coprocessor 501 will be described, with reference to FIGS. 9-14. Generally, the branch stream coprocessor 501 operates as follows.

As shown in FIG. 3, the branch stream coprocessor 501 withdraws instruction quadwords from the instruction buffer 401 under control of the BA/TA stack 503 in the branch stream coprocessor 501, and selects pairs of instructions (whenever possible; six-byte instructions are processed as dual instructions), in order to scan the instructions and to pre-execute test and branch instruction pairs. This scanning and pre-execution determine the majority of branch outcomes.

In this description of branch resolution, only the two most frequently-encountered test instructions, Test Under Mask (TM) and Compare Logical Immediate (CLI), and only the most frequent accompanying branches, Branch On Condition (BC) and Branch On Condition Register (BCR) are discussed, in order to simplify the explanation. However, it should be understood that the invention is not restricted to handling these test and branch instruction pairs. Indeed, there are many other types of such instructions which the invention is capable of handling, and which in fact properly should be included in any reasonable design. Such instructions include Compare (C), Compare Logical (CL), and Compare Register (CR).

Load instructions also are routed through the branch stream coprocessor 501, in order to resolve possible address generation interlock situations, which were described briefly above, and will be described in greater detail below. Load instructions are the instructions which most frequently create such situations. The approach of the invention to resolving these situations will be discussed in greater detail below.

After the instructions are scanned, they are entered into the ready-to-decode buffer 601, whether they have been pre-executed or not. Status tags are included in the instructions to identify whether or not they have been pre-executed, and whether or not they are branches, either executed or unexecuted. Also, an instruction count is included, to enable subsequent identification of entries in the ready-to-decode buffer 601.

As the branch stream coprocessor 501 resolves branches, or as address generation interlock situations are detected, entries are made in the status tags of the corresponding instructions in the ready-to-decode buffer 601. These tags allow the main stream processor 701 to distinguish between already-resolved and unresolved branches, and also alert the main stream processor 701 to possible address generation interlock situations.

Now, referring to FIG. 9, the procedure for providing instructions to the branch stream coprocessor 501 will be described. The prefetching procedure already discussed provides the appropriate instructions to the instruction buffer 401. However, the different possible lengths of the instructions presents a problem when deciding how the instructions should be provided to the branch stream coprocessor 501. As stated previously, if the instructions are two or four bytes long, there is no problem fetching them two at a time to the branch stream coprocessor 501. However, six-byte instructions require two addresses, so that using two address generation facilities would be preferable. As a result, not even a two-byte instruction can be fetched at the same time as a six-byte instruction.

Figure 9:
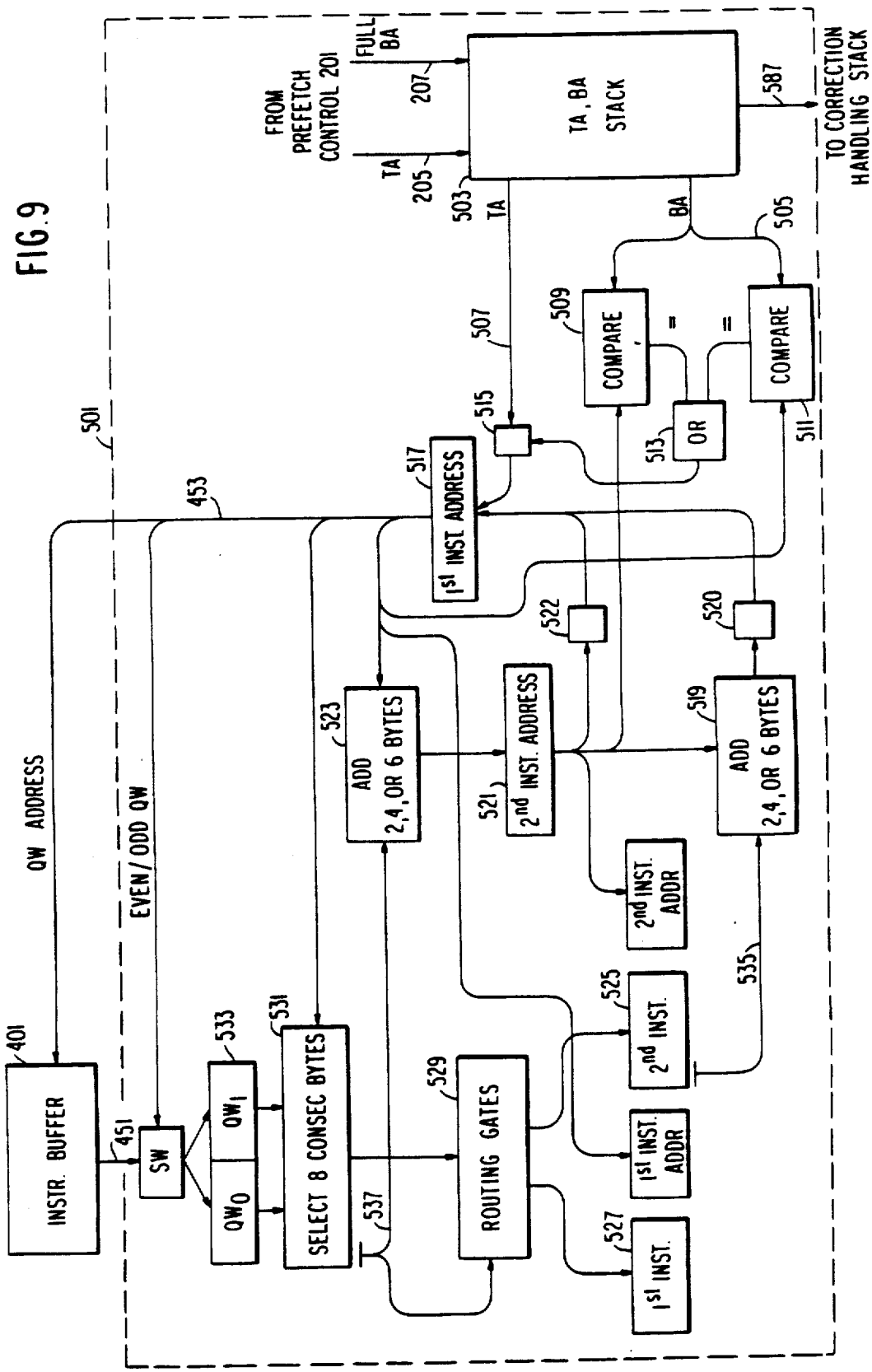
FIG. 9 is a diagram showing how pairs of instructions are selected for entry to the branch stream coprocessor.

In FIG. 9, a first instruction address register 517 contains the address of the first instruction of a given instruction pair which is to be fed to the branch stream coprocessor 501. This address is passed along a path 453 to the instruction buffer 401, which outputs a corresponding quadword along a path 451 to a double quadword register 533.

Quadwords are entered into the double quadword register 533 as follows. If the quadword address is even, the quadword is placed in position QW0 in the register; otherwise, it is odd, and so is placed in position QW1. This convention is followed in order to get eight consecutive bytes (assuming each of two consecutive instructions are four bytes long, the maximum permissible for two consecutive instructions to be processed as a pair).

Figure 10:
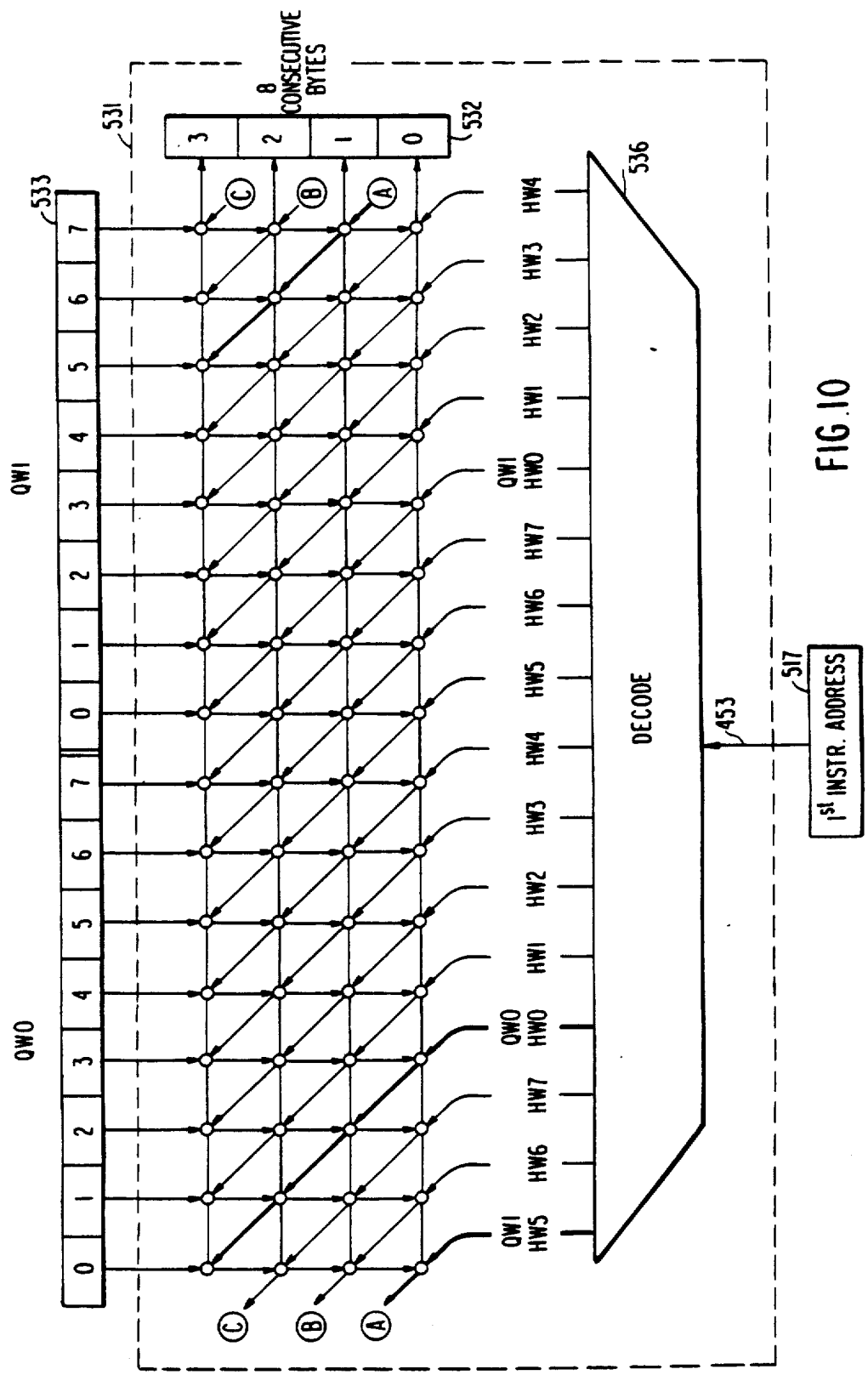
FIG. 10 is a diagram showing in greater detail some of the elements shown in FIG. 9.

Instructions are accessed to the halfword (two bytes). In FIG. 10, the halfwords in the double quadword register 533 are shown as running from 0 to 7 in QW0 and from 0 to 7 in QW1. Since QW0 holds even quadwords and QW1 holds odd quadwords, it does not follow that QW0 always contains instructions ahead of QW1. The proper sequence may be either QW0, QW1 or QW1, QW0. The choice of sequence will be determined by the first instruction address 517 which caused the double quadword register 533 to be loaded. The first instruction address 517 will select the starting halfword for the eight consecutive byte sequence from either QW0 or QW1 in register 533.

The first instruction address 517 is decoded by decoder 536 to select a halfword starting position in either QW0 or QW1. These choices are shown at an output of a decoder 536 in FIG. 10. For a given first instruction address, one of these decoder outputs will be activated, thereby enabling a set of four gates in a leftward, diagonally upward direction. Inputs to these gates are four consecutive halfwords from the double quadword register 533. The enabled gates cause the four halfwords to be transferred on the horizontal lines to the right into respective positions 0-3 in an eight consecutive bytes register 532. There are four horizontal lines, each carrying one of the halfwords.

As an example of operation of this select eight consecutive bytes switch 531, suppose the instruction address in the instruction address register 17 starts with HW0 in QW0. The decoder 536 will enable the QW0, HW0 line, shown as a darker line in FIG. 10, causing HW0 of QW0 in the double quadword register 533 to be transferred on the upper horizontal line into position 3 of the eight consecutive bytes register 532. In a similar manner, HW1 will be transferred on the next lower horizontal line into position 2 of the eight consecutive bytes register 532, and HW2 and HW3 will be transferred on respective lower horizontal lines into positions 1 and 0 of the eight consecutive bytes register 532.

As another example, suppose the first instruction address starts with HW5 in QW1. The decoder 536 then will enable the QW1, HW5 line, also shown as a darker line in FIG. 10 which continues on the far right (the diagonal line labeled A). In this case, the halfwords 5, 6, and 7 of QW1 are in respective positions 3, 2, and 1 of the eight consecutive bytes register 532, followed by HW0 of QW0 in position 0. (In this case, QW0 was loaded after QW1.)

At least the first halfword of the above-mentioned first instruction will be obtained from the first quadword. A select 8 consecutive bytes switch 531 sends the two leftmost bits of this first halfword on a path 537 to routing gates 529, and to adder circuit 523, which adds whatever is necessary to the first instruction address in first instruction address register 517 to obtain the second instruction address, which is placed in second instruction address register 521. Since as many as eight consecutive bytes are to be selected, and since the length of the first instruction is known, the address of the second instruction can be easily obtained.

If the address of the second instruction is for the same quadword as the first instruction, no additional fetch is necessary, as that quadword already is in the eight consecutive bytes register 532. However, if the address is for the next sequential quadword, the address is placed in first instruction address register 517, and another fetch from the instruction buffer 401 is made. In any event, after one or the other procedure is complete, eight consecutive bytes will be in the eight consecutive bytes register 532.

These eight consecutive bytes are applied to routing gates 529, as shown in greater detail in FIG. 11. The first two bits of the operation code of the first instruction in the eight consecutive bytes register 532 determine the length of that first instruction. A partial decoder 530 consists of four two-bit comparators 534, as shown in greater detail in FIG. 12. Depending on the values of the first two bits, only one comparator will output a true routing signal to control the routing gates 529, shown in FIG. 11. Depending on the length of the first instruction, the routing gates 529 route the proper halfwords to the first instruction register 527 and the second instruction register 525. As shown in FIG. 11, the third halfword of a six-byte instruction is routed to the second halfword position of the second instruction register 525, in order to enable use of the second address generation facility.

As shown in FIG. 9, the length of the second instruction in second instruction address register 525 is sent via path 535 to an add circuit 519, which adds the appropriate number of bytes (i.e. the length of the second instruction) to the second instruction address (from second instruction address register 521) to yield the third instruction address, which is the first instruction of the next instruction pair. This new address then is sent to first instruction address register 517, whereby the next instruction pair is fetched.

As described earlier, the BA/TA stack 503 contains addresses of branches which the branch history table 301 predicts will be taken. The contents of the first and second instruction address registers 517 and 521 are sent to compare circuits 509 and 511, respectively. The BA portion of the oldest entry in the BA/TA stack 503 also is sent to each of these circuits. If one of the compares is true (i.e. the input addresses are the same), the corresponding TA part of the stack entry is sent via a path 507 through gate 515, which is enabled by the output of OR circuit 513, to be the next address placed in first instruction address register 517. Note that both of the compare circuits 509 and 511 will not indicate equality simultaneously, because different addresses are input for comparison with the BA portion sent from the BA/TA stack 503.

The first and second instructions in respective registers 525, 527 now should be ready to be scanned. The scanning of the first instruction of the pair will be described below; a substantially identical procedure is carried out, with parallel circuitry, for the second instruction of each pair as well. The major difference between the scanning of the two instructions relates to the circuit 561, which will be discussed below.

The ready-to-decode buffer 601 has corresponding stacks for each set of circuitry; the main stream processor 701 accepts instructions alternately, in sequence, from each of the stacks. This procedure also will be described below.

Figure 13:
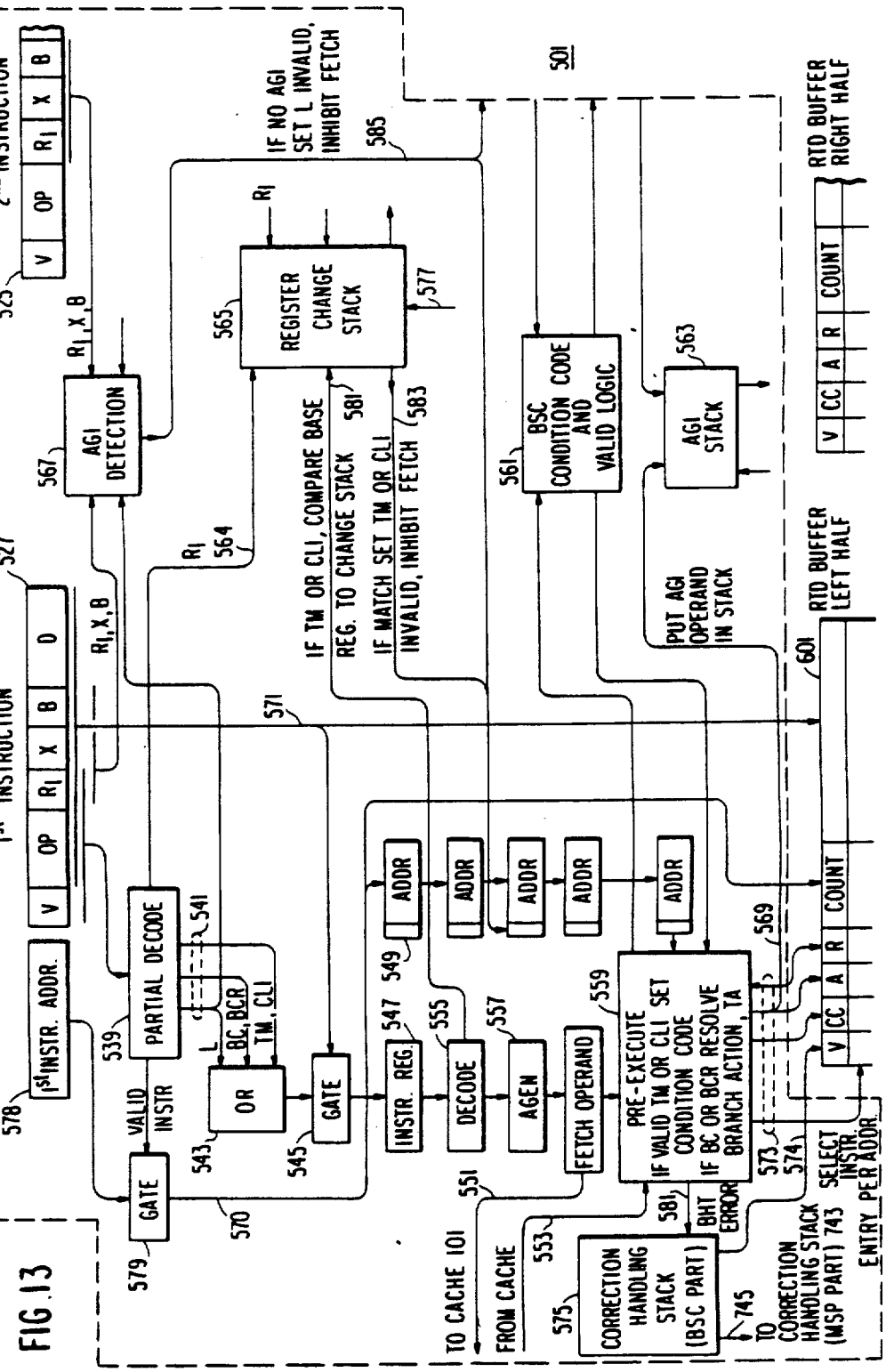
FIG. 13 is a more detailed schematic of the branch stream coprocessor shown in FIG. 3.

As shown in FIG. 13, the validity bits stored in the first and second instruction registers 525 and 527 are used to denote valid instructions, a necessary precaution, as valid instructions are not invariably present every machine cycle. The OP (Opcode) and $R_1$ (register to be loaded) fields of the first instruction are sent to a partial decode circuit 539, so that the instruction may be identified. Again, there are a number of possible instructions; for simplicity, this discussion is concerned only with Load, Branch on Condition, Branch on Condition Register, Test Under Mask, and Compare Logical Immediate instructions. If a given instruction is identified as being of one of these types, and it is a valid instruction, an OR circuit 543 enables a gate 545 to pass the instruction to an instruction register 547. At this time, an instruction address register 549, which is the first of a series of instruction registers, receives the first instruction address through a gate 579.

The instruction address register 549 is important for the following reasons, among others. Of course, a valid instruction residing in first instruction register 527 during a given cycle and not needing pre-execution will pass directly to the ready-to-decode buffer 601 during the next cycle, in order to keep the buffer as full as possible. As an instruction which needs pre-execution (e.g. one of the five instructions mentioned above) passes through the branch stream coprocessor, it goes through the successive stages of the instruction register 547, a decode step 555, an address generate step 557, and a pre-execution step 559. Each stage takes one cycle, so that the overall pre-execution process takes several machine cycles. If the sequence of passage of the instruction through the various stages 547, 555, 557, and 559 in the branch stream coprocessor 501 were not recorded somehow, then it would be difficult to determine the proper place for the instruction in the ready-to-decode buffer 601. Further, should the branch history table 301 need correction, the proper sequential placement of the corrected instruction will be extremely difficult, if not impossible. Consequently, keeping a proper count enables correction of entries to the ready-to-decode buffer 601.

An instruction needing pre-execution passes into the branch stream coprocessor pipeline in instruction register 547, its corresponding count being in instruction address register 549. The instruction is decoded in step 555, and the indicated base register of the general purpose registers (not shown) is accessed to prepare for the address generation step which follows. If the instruction is a Test Under Mask or a Compare Logical Immediate instruction, a check must be made that the base register will not be changed by a previous instruction that has not yet been executed by the main stream processor 701. (Only the main stream processor changes contents of general purpose registers.) This check is done by sending the $R_1$ field of each instruction that changes a general purpose register from the partial decode circuitry 539 via a path 564 to a register change stack 565. Blank entries are made for instructions which do not change general purpose registers. The stack has room for as many entries as are in the left and right portions of the ready-to-decode buffer. At the decode step 555, an instruction is sent to the register change stack 565 via a path 581 to compare the base register field of Test Under Mask and Compare Logical Immediate instructions to the contents of this stack. If there is a match, a bit is set in the next address generation step 557 to mark the instruction as invalid. If the instruction is marked invalid, a signal is sent over a line 583 to the register corresponding to the address generation step 557, so that the operand will not be fetched.

Now, the procedure for anticipating and handling possible address generation interlock situations will be described. If the instruction currently being decoded is a Load instruction, its execution may change a general purpose register which may be used as a base register by the next instruction. This situation is called address generation interlock, because the next instruction cannot generate an address until the new base value returns from the cache. Since address generation interlocks are a source of considerable delay, it is important to detect them. Consequently, each Load instruction is inserted into the pipeline under the assumption that it may cause address generation interlock. In the meantime, the $R_1$ field (the register to be loaded) is sent to an AGI (address generation interlock) detection circuit 567, as shown in FIG. 13, to be compared with the base field of the following instruction. If there is no match, there is no address generation interlock, and the Load instruction will be set invalid at the address generation step 557 by a signal output over a line 585, so that no operand fetch will occur.

If there is a match, indicating address generation interlock, the Load instruction will proceed, and the operand will be fetched from the cache 101 via a path 551 and a path 553. The pre-execution step 559 will send the operand on a path 569 to an AGI stack 563 and also will render high an address generation interlock bit (A) in the ready-to-decode buffer entry for the Load instruction, as identified by the associated count value. Later on, when the Load instruction is executed in the main stream processor 701, the presence of the A bit will cause the main stream processor 701 to get the oldest entry from the AGI stack 565 for use as the base value of the following instruction.

If a Test Under Mask or Compare Logical Immediate instruction is not marked as invalid as described above, it will proceed through the pipeline. The operand will be fetched from cache 101 via the paths 551 and 553, and the pre-execute step 559 will generate the condition code and send it to a BSC (branch stream coprocessor) condition code and valid logic circuit 561. In this logic, an unlikely but possible situation is checked for. A Test Under Mask or Compare Logical Immediate instruction is almost always followed by a Branch on Condition or Branch on Condition Register, in which case the condition code is the proper one for the Branch on Condition or Branch on Condition Register instruction to act on. However, there could be an intervening instruction which could alter the condition code generated by the Test Under Mask or Compare Logical Immediate instruction, thereby rendering the generated condition code unreliable. When such a situation is detected, the condition code is marked invalid. The logic for this procedure is shown in tabular form in FIG. 14. Note that three successive instructions enter into this logic.

Valid condition codes are entered into the ready-to-decode buffer 601 for the associated Test Under Mask or Compare Logical Immediate instruction, since the main stream processor 701 will need them to update the actual condition code. As instructions are withdrawn from the ready-to-decode buffer 601 and are executed by the main stream processor 701, a signal is sent to the register change stack 565 via a path 577 to remove the oldest entry. This step ensures that the contents of the register change stack 565 reflect only register changes that the main stream processor 701 has not yet made.

If the instruction being decoded in step 555 is a Branch on Condition or Branch on Condition Register instruction, the address will be determined in step 557. However, no fetch will be made to the cache. Such a fetch would be necessary later on if the branch history table 301 was incorrect. Instead, the target address is forwarded to the pre-execution step 559 for comparison with the target address predicted by the branch history table 301. A branch take/not take action as determined by the pre-execution step 559 also is compared with the branch history table prediction. If either does not compare positively, then error information is sent to the branch stream coprocessor portion 575 of the correction handling logic. Otherwise, the branch history table prediction is confirmed, and the branch is resolved. A branch resolved (R) bit is then sent via a line 573 to the ready-to-decode buffer 601 and is placed with the entry containing the branch.

At this point, it should be noted that it is desirable to keep the branch stream coprocessor 501 as far ahead of the main stream processor 701 as possible. Because the branch stream coprocessor 01 scans instructions two at a time and does not pre-execute all the instructions it scans, the coprocessor's "lead" over the main stream processor 701 will tend to grow without limit, notwithstanding the necessary early handling of conditional branches and potential address generation interlock situations which would tend to slow down the branch stream coprocessor 501. The size of the "lead" will be limited by the size of the ready-to-decode buffer 601. In this preferred embodiment, the ready-to-decode buffer 601 is sized to keep the branch stream coprocessor 501 up to 32 instructions ahead of the main stream processor 701.

Figure 15:
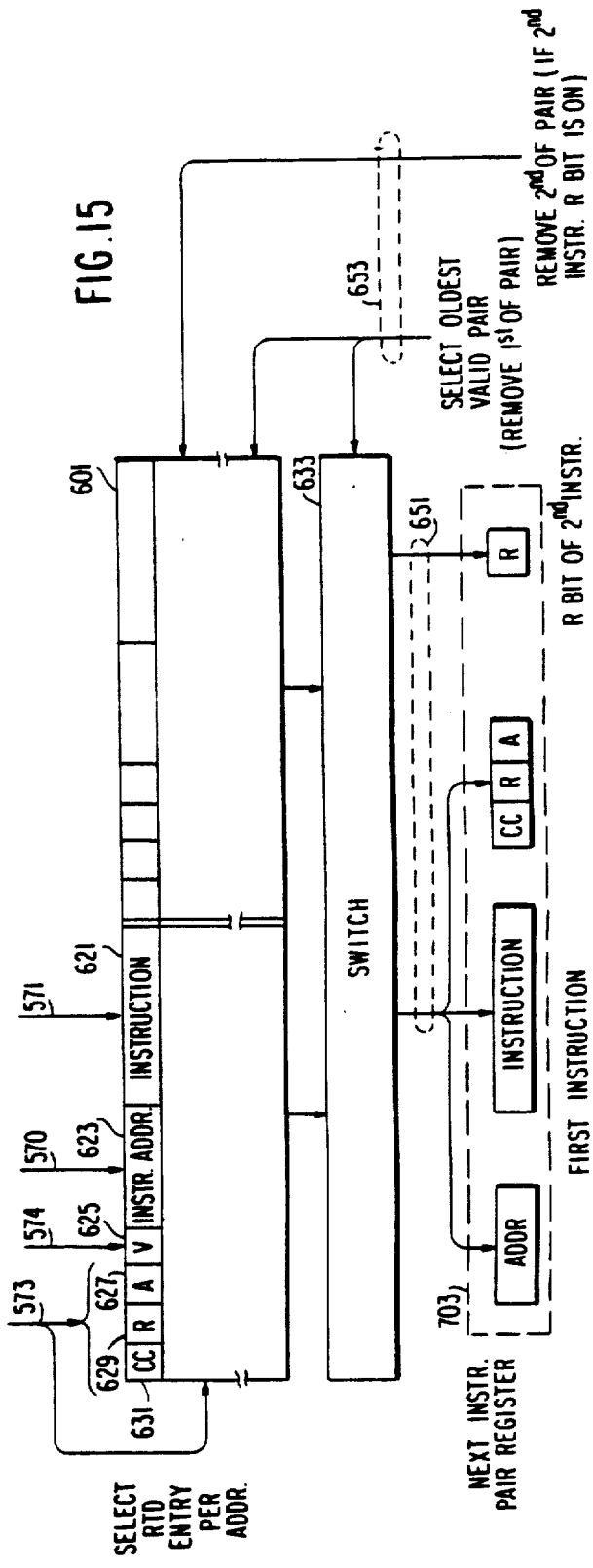
FIG. 15 is a more detailed diagram of the ready-to-decode buffer shown in FIG. 3.

The operation of the ready-to-decode buffer 601 now will be described, with reference to FIG. 15. As previously explained, all instructions pass to the ready-to-decode buffer 601, whether or not they have been acted upon by the branch stream coprocessor 501. In addition, pre-executed Test Under Mask, Compare Logical Immediate, Branch on Condition, Branch on Condition Register, and Load instructions result in subsequent entries into this buffer. These entries are entries to a condition code (CC) field 631, a branch resolved (R) field 629, an address generation interlock (A) field 627, and a validity field 625. These subsequent entries guide the main stream processor 701 in significant variations of normal processor activity. These variations constitute an important part of the invention.

The ready-to-decode buffer 601 is a push-down stack. Each instruction 621 is entered via a path 571, and a corresponding instruction address 623 is entered via a path 570. The instruction address 623 identifies the entry when subsequent information, as described above, is to be added. Part of this subsequent information comes in via a path 573 from the pre-execution step, and sets either the condition code 631 (two bits), the branch resolved bit 629, or the address generation interlock bit 627. The validity bit 625 is set to valid when an instruction is entered into the ready-to-decode buffer 601, since only previously valid instructions are admitted to this buffer. However, the bit 625 may be changed to invalid if a branch prediction error is detected in either the branch stream coprocessor 501 or the main stream processor 701. The first such invalid instruction following the wrongly predicted branch, and all subsequent instructions in the ready-to-decode buffer 601 and in the pipeline of the branch stream coprocessor 501, also will be marked invalid.

The main stream processor 701 withdraws entries from the bottom of the stack of the ready-to-decode buffer 601, that is, the oldest entries. Only valid entries count; invalid entries are skipped. It should be noted that the ready-to-decode buffer 601 has left and right entries, and that the righthand entry of a pair is older than the lefthand entry. The main stream processor 701 preferably withdraws instructions alternately from the righthand and lefthand portions of the ready-todecode buffer stack.

A switch 633 selects the two oldest entries and presents the older of the two selected via a path 651 to a next instruction pair register 703 as the first instruction. The next oldest instruction, represented only by its branch resolved bit 629, also is presented on the path 651.

The branch resolved bit of the next oldest instruction is of unique interest because it denotes that the instruction is a branch which has been resolved by the branch stream coprocessor 501. It also denotes corrections to the branch history table 301 when necessary. As a result, the following conditions hold:

1. Valid instructions in the ready-to-decode buffer 601 following the resolved branch, and up to and including the next branch, are the correct instructions to be executed.

2. The first instruction in the next instruction pair register 703 is either a Test Under Mask or a Compare Logical Immediate instruction, which only set the condition code. Since the correct condition code value was determined by the branch stream coprocessor 501, and is part of entry in the ready-to-decode buffer 601, it is not necessary to refetch the Test Under Mask or Compare Logical Immediate operand. The condition code value will be carried along through the pipeline of the main stream processor 701 and will be used to update the main stream processor condition code at the proper time during execution of the Test Under Mask or Compare Logical Immediate instruction.

3. The second instruction, the resolved branch, indicated by its branch resolved bit, does not need a decode cycle in the main stream processor, and does not need to appear in the main stream processor pipeline, since the following instructions in the ready-to-decode buffer 601 already correctly reflect the action of the branch, including the instruction addresses. Essentially, then, the branch is converted into a no operation instruction in the main stream processor 701. Only one decode cycle is used for the Test Under Mask/Compare Logical Immediate branch pair, and the next decode cycle is available for the following instruction. As a result, fewer decode cycles are required for the same number of instructions, thereby improving cycles per instruction performance.

It should be noted that, when the branch resolved bit 629 is "off", the first instruction in the next instruction pair register 703 is entered into the pipeline of the main stream processor 701, and only then is the first instruction removed from the ready-to-decode buffer 601. The second instruction then will become the first instruction of th next pair. When the branch resolved bit 629 is "on", the second instruction also is removed from the ready-to-decode buffer 601 via a signal sent along a line 653 since, as described above, its effect already has been accomplished.

The operation of the main stream processor 701 now will be described, with reference to FIG. 16. Except for the special conditions discussed below, the main stream processor 701 operates in the same manner as a high performance pipelined processor, such as the IBM 3033 or the 3090. The pipeline consists of a decode step 717, an address generate step 729, a cache access step via paths 751 and 753, an execute and putaway step 735, and an endop step 737. As in the IBM 3033 or 3090, the pipeline is designed so that instructions can be executed at a rate of one per processor cycle. However, certain instructions will require more than one cycle in the execution step, and the pipeline may be delayed until these instructions are executed.

Figure 16:
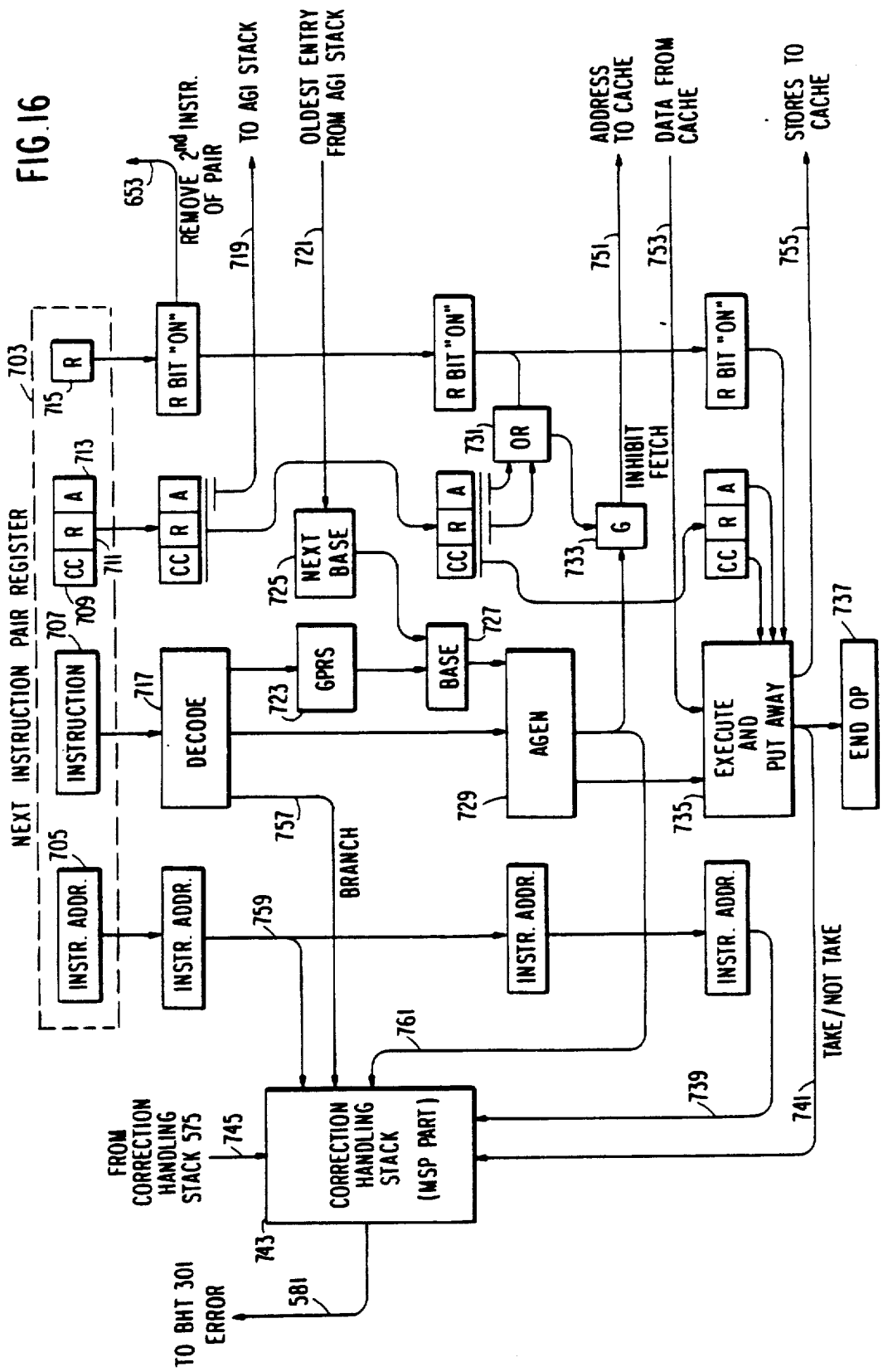
FIG. 16 is a more detailed diagram of the main stream processor shown in FIG. 3.

In order to handle the special conditions which are a part of the invention, an instruction address 705 for each instruction is carried along for each step of the pipeline, as shown in FIG. 16. Also, condition code bits 709, a branch resolved bit 711, and an address generation interlock bit 713 are carried along through the pipeline.

Some of the special conditions which the main stream processor 701 must handle are as follows:

1. A branch resolved bit 715 of the second instruction of the instruction pair in the next instruction pair register 703 is "on".

As previously explained, this condition means that the second instruction is a branch which already has been resolved by the branch stream coprocessor 501, and so will be treated as a no operation instruction by the main stream coprocessor 701. Also, the first instruction has been pre-executed and the resulting condition code bits 709 are available to be used in the Execute and Putaway step 735. Therefore, it is not necessary to refetch the operand of the first instruction. Under this condition, the pipeline steps are as follows:

a. Decode step 717 — the first instruction 707 in the next instruction pair register 703 enters the decode step 717. The instruction address 705 of this instruction is transferred to the decode step 717, as are the condition code bits 709, the branch resolved bit 711, and the address generation interlock bit 713. The branch resolved bit 715 of the second instruction also is transferred. Since this bit is "on", a signal is sent to the ready-to-decode buffer 601 via path 653, thereby causing the second instruction to be removed. As a result, the "next" first instruction appearing in the next instruction pair register 703 will be the instruction following the resolved branch.

b. Address generation step 729 — Since the second instruction will be treated as a no operation instruction by the main stream coprocessor 701, no address need be generated, so that this step may be bypassed.

c. Execute and putaway step 735 — the first instruction enter the execute and putaway step 735, along with its address and associated bits, and the branch resolved bit 715 of the second instruction. Since this bit is "on", the condition code bits 709 are used to set the condition code of the main stream processor 701.

d. Endop step 737 — this step signals the proper end of the instruction, and often is combined with the execution step 735.

2. The address generation interlock bit 713 of the first instruction of the instruction pair in next instruction pair register 703 is "on".

Under this condition, the first instruction is causing an address generation interlock, so that it is loading a register that the following instruction will use as its base register. The pipeline steps under this condition are as follows:

a. Decode step 717 — the "on" state of the address generation interlock bit is detected in this step. This detection results in a request being sent to the AGI stack 563 via a path 719. The AGI stack 563 originally was loaded by the branch stream coprocessor 501 with the new register values which will be needed by the interlocked instructions.) The oldest entry from the stack is returned via a path 721 to a next base register 725, and will be transferred to a base register 727 for use by the next instruction.

b. Address generation step 729 — a generated address is not necessary for this instruction, since the branch stream coprocessor 501 performed this step earlier. In any event, there is no harm in letting this step proceed. However, it is desirable to inhibit a cache fetch. This inhibiting is accomplished by the passage of the "on" state of the address generation interlock bit 713 via an OR gate 731 and a gate 733.

c. Execute and putaway step 735 — the "on" state of the address generation interlock bit 713 causes the contents of the next base register 725 (carried along in the pipeline, though not shown) to be put into the general purpose registers of the main stream processor 701.

3. The first instruction in the next instruction pair register 703 is a branch.

Since a branch is appearing as the first instruction, the branch stream coprocessor 501 has not resolved it. Consequently, it will be necessary to check its actual target address from the address generation step 729 against the target address which the branch history table 301 has predicted. Also, it will be necessary to compare the actual action taken, as determined in the execute and putaway step 735, against the action which the branch history table 301 predicted. In other respects, the branch proceeds conventionally through the pipeline. The pipeline steps are as follows:

a. Decode step 717 — A signal that this instruction is a branch is sent via a path 757 to a correction handling stack 743. The instruction address also is sent, on a path 759. The correction handling stack 743 locates the predicted target address for this branch, and, when the actual target address is available from the address generation step 729 on a path 761, a comparison is carried out between the two. If they match, the prediction was correct, and no branch history table correction is needed. However, if there is no match, the branch history table 301 contains an error. This error is signalled on a path 581 to the branch history table 301 (see FIG. 17). In this case, all instructions following the wrongly predicted branch, in the pipeline, the ready-to-decode buffer 601, and the instruction buffer 401, are invalid. The branch history table 301 must be corrected, and instruction prefetching must resume with the correct target address. This procedure will be described in greater detail below.

b. Execute step 735 — The actual branch action is determined, and is sent to the correction handling stack 743 via a take/not take path 741. The branch address is sent on a path 739. If the branch actually was taken, and there is a corresponding entry in the correction handling stack 743, there is no error. Similarly, if the branch actually was not taken, and there is no corresponding entry in the correction handling stack, there is no error. Otherwise, as will be described below, there is an error.

Except for the preceding special conditions, all instructions proceed normally through the pipeline. However, it should be noted that two particular situations will not occur:

1. The first instruction of the pair has its branch resolved bit 711 "on", indicating that it is a resolved branch. This bit never should be on for the first instruction because the instruction will have appeared immediately before as a second instruction with its branch resolved bit 711 on. Therefore, the first instruction will have been handled as described above, and so will have been deleted from the ready-to-decode buffer 601.

2. The first instruction has its address generation interlock bit "on" and the second instruction has its branch resolved bit "on". This situation will not occur because the first instruction, which causes an address generation interlock, must be a Load instruction, and so is neither a Test Under Mask nor a Compare Logical Immediate instruction. The logic in FIG. 14 shows that, in this case, the condition code bits 709 would be marked invalid. If the second instruction was a branch, it could not have been resolved without a valid condition code.

Branch history table correction now will be described, with reference to FIG. 17. Such correction becomes necessary either through pre-execution activity of the branch stream coprocessor 501, or through subsequent regular execution activity of the main stream processor 701 with regard to branches which the branch stream coprocessor 501 was unable to resolve.

Figure 17:
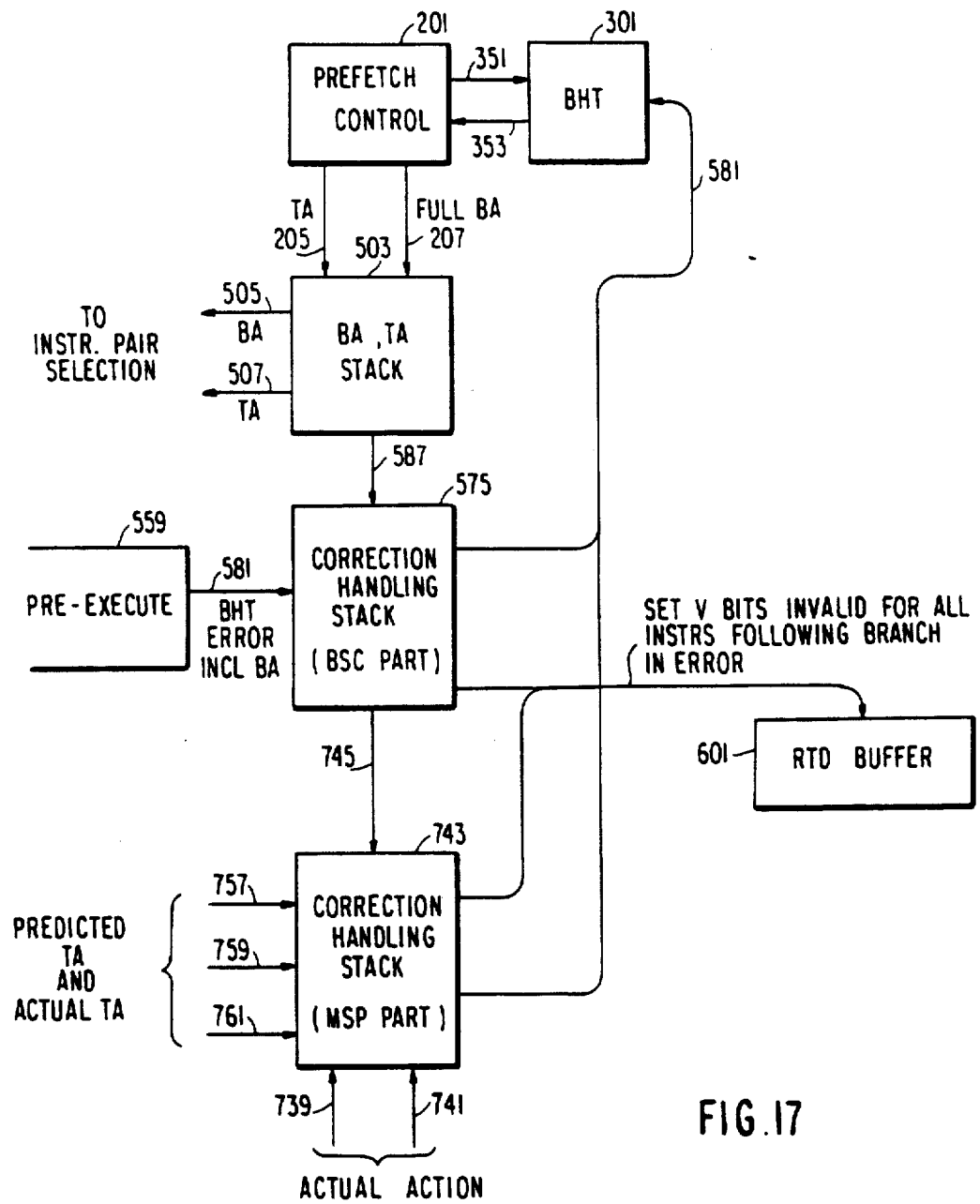
FIG. 17 is a diagram showing branch history table correction.

FIG. 17 also shows the overall activity of the branch history table 301, as well as the means for correcting it. As discussed above, the prefetch control 201 initiates quadword instruction fetches via a path (not shown in the Figure) from the cache 101 into the instruction buffer 401. Each quadword fetch address also is sent to the branch history table 301 via the path 351. If there is a corresponding entry, the branch history table 301 will Y0984-103 return a branch target address to the prefetch control 201 via the path 353. Which branch target address is returned will determine the next quadword instruction fetch, and so on. Such branch history table entries, which include both the target address and the associated branch address, are forwarded to the BA/TA stack 503 via the paths 205 and 207 to guide the selection of instruction pairs for presentation to the branch stream coprocessor 501.

Entries from the BA/TA stack 503 then are forwarded via a path 587 to a branch stream coprocessor portion 575 of the correction handling stack, in order to handle branch history table errors which the branch stream coprocessor 501 may detect in the pre-execution step 559 (FIG. 13). All such detected errors during the pre-execution step 559 are signalled to the correction handling stack 575 via a path 581.

When an error is detected, two operations must be performed. First, all instructions which have been prefetched into the instruction buffer 401, or which are following the wrongly predicted branch in the pipeline of the branch stream coprocessor 501 must be invalidated. Second, a branch history table correction must be signalled on the path 581.

The information transmitted on the path 581 includes the branch address (to identify the branch history table entry to be corrected), the actual target address, and the actual action taken. If the target address was incorrect, the branch history table 301 receives the corrected target address on the path 581. If the branch actually was taken, and the branch history table 301 predicted that it would not be taken, the new branch and target addresses are entered into the branch history table 301, again via the path 581. If the branch actually was not taken, but the branch history table 301 predicted that it would be, the corresponding entry is deleted. The deletion instruction is sent via the path 581.

Since the branch stream coprocessor 501 will not resolve all branches, entries in the branch stream coprocessor portion 575 of the correction handling stack for those branches not resolved are forwarded via a path 745 to the main stream processor portion 743 of the correction handling stack. The main stream processor 701 handles branch prediction errors in a manner similar to that of the branch stream coprocessor 501, as was discussed above, and as indicated in FIG. 17.

It should be noted that there are architectural rules concerning the relationship of fetches to stores. This was discussed to some extent earlier. For this embodiment, attention should be paid to whether the fetches made by the branch stream coprocessor 501 are occurring earlier than their proper position in the instruction stream. Though not shown here, it is well known how to detect when subsequent stores or other operation would make such early fetches invalid, or possibly invalid, and prevent further actions based on these invalid fetches.

As described above, according to the invention, conditional branches are resolved by a branch stream coprocessor, during prefetching of instructions to the main stream processor pipeline, to the greatest extent possible, in order to enable a main processor to come closer to executing one instruction per machine cycle. As a further enhancement of processing, address generation interlock situations are detected, and, if possible, are handled by the branch stream coprocessor. The normal pipeline of the main stream processor then is quite similar to conventional pipelines, except that certain bits are added to indicate whether a branch has been resolved, or whether an address generation interlock situation has been detected and handled earlier.

Having thus described our invention, what we claim as new, and desire to secure by Letters patent is:

1. A computing apparatus for executing program instructions in instruction sequences, said instruction sequences including a first type of instructions, which include conditional branch instructions, and a second type of instructions, different from said first type, outcomes of execution of said conditional branch instructions determining choices among alternative ones of said instruction sequences, said computing apparatus comprising:
   memory means for storing said program instructions and data;
   prefetching means for prefetching said program instructions from said memory means and forming said instruction sequences, said prefeteching means including means for making preliminary guesses as to said outcomes of execution of said conditional branch instructions;
   pre-executing means, comprising means for receiving said instruction sequences from said prefetching means and preexecuting ones of said first type of instructions and means for adjusting said prefetching means in accordance with outcomes of pre-execution of ones of said first type of instructions so as to maximize a percentage of said preliminary guesses which are correct, said pre-executing means further comprising means for removing, from said instruction sequences, prefetched instructions based on an incorrect preliminary guess, in accordance with said outcomes of pre-execution of said ones of said first type of instructions;

buffer means for storing said instruction sequenc4s without said prefetched instructions based on said incorrect preliminary guess, from said buffer means in advance of when they are needed by said main processing means, said main processing means executing said program instructions and processing said data accordingly.

2. A computing apparatus as claimed in claim 1, wherein said pre-executing means further comprises means for minimizing a number of errors occurring in said instruction sequences formed by said prefetching means.

3. A computing apparatus as claimed in claim 1, wherein said means for making preliminary guesses comprises a table containing information indicative of said outcomes of execution of said conditional branch instructions, said adjusting means including means for updating entries in said table in accordance with said outcomes of pre-execution of said first type of instructions.

4. A computing apparatus as claimed in claim 3, wherein said means for updating entries comprises means for adding said entries to and deleting said entries from said table.

5. A computing apparatus as claimed in claim 4, wherein said instruction sequences without said prefetched instructions based on said incorrect preliminary guess contain first and second types of information indicative of said outcomes of pre-execution of said first type of instructions, said main processing means executing said instruction sequences without said prefetched instructions based on said incorrect preliminary guess in accordance with said first and second types of information.

6. A computing apparatus as claimed in claim 5, wherein said first type of information includes information indicative of whether a given one of said conditional branch instructions has been resolved.

7. A computing apparatus as claimed in claim 6, wherein said first type of instructions further includes load instructions which change a register that will be used by an immediately following instruction, said computing apparatus further comprising means for calculating a new register value in response to detection of one of said load instructions, said main processing means using said new register value as soon as needed by said immediately following instruction.

8. A computing apparatus as claimed in claim 7, wherein said pre-executing means further comprises:
means for receiving said instructions from said instruction sequences two at a time from said prefetching means; and
means for scanning said instructions two at a time, ones of said second type of instructions being output directly to said main processing means without being pre-executed.

9. A computing apparatus as claimed in claim 8, wherein said main processing means comprises means for correcting said prefetching means.

10. A computing apparatus as claimed in claim 9, wherein said second type of information includes load instruction information indicative of whether a first instruction in each of said instructions taken two at a time is one of said load instructions which change a register that will be used by said immediately following instruction, said main processing means using said new register value in accordance with said load instruction information.

11. A computing apparatus as claimed in claim 1, wherein said first type of instructions includes load instructions that change a register that will be used by an imemdiately following instruction, said computing apparatus further comprising means for calculating a new register value in response to detection of one of said load instructions, said main processing means using said new register value as soon as needed by said immediately following instruction.

12. A computing apparatus as claimed in claim 11, wherein said pre-executing means further comprises:
means for receiving said instructions from said instruction sequences two at a time from said prefetching means; and
means for scanning said instructions two at a time, ones of said second type of instructions being output directly to said main processing means without being pre-executed.

13. A computing apparatus as claimed in claim 12, wherein said instruction sequences without said prefetched instructions based on said incorrect preliminary guess contain first and second types of information indicative of said outcomes of pre-execution of said first type of instructions, said main processing means executing said instruction sequences without said prefetched instructions based on said incorrect preliminary guess in accordance with said first and second types of information.

14. A computing apparatus as claimed in claim 13, wherein said second type of information includes load instruction information indicative of whether a first instruction in each of said instructions taken two at a time is one of said load instructions that change a register that will be used by said immediately following instruction, said main processing means using said new register value in accordance with said load instruction information.

15. A computing method for executing program instructions in instruction sequences, said instruction sequences including a first type of instructions, which include conditional branch instructions, and a second type of instructions, different from said first type, outcomes of execution of said conditional branch instructions determining choices among alternative ones of said instruction sequences, said computing method comprising the following steps:
storing said program instructions and data in a memory;
prefetching said program instructions from said memory, including making preliminary guesses as to said outcomes of execution of said conditional branch instructions;
forming said instruction sequences in accordance with said prefetching step;
pre-executing ones of said first type of instructions in said instruction sequences, including pre-executing said conditional branch instructions and identifying, in said instruction sequences, prefetched instructions based on an incorrect preliminary guess, said pre-executing step further including optimizing said prefetching step in accordance with said outcomes of said pre-executing step, said optimizing step including the step of maximizing a number of correct ones of said preliminary guesses;

compiling instruction sequences without said prefetched instructions based on said incorrect preliminary guess in accordance with outcomes of said pre-executing step;

storing said instruction sequences without said prefetched instructions based on said incorrect preliminary guess in a buffer means in advance of when they are needed by said main processing means;

transmitting said instruction sequences without said prefetched instructions based on said incorrect preliminary guess from said buffer means to a main processing means; and executing said program instructions and processing said data in accordance with said instruction sequences without said prefetched instructions based ons aid incorrect preliminary guess.

16. A method according to claim 15, wherein said instruction sequences without said prefetched instructions based on said incorrect preliminary guess contain pre-execution information indicative of outcomes of execution of said conditional branch instructions, said execution step being performed in accordance with said pre-execution information.

17. A method according to claim 16, wherein said pre-executing step further comprises the step of scanning said instruction sequences two at a time to increase a rate at which said executing step is performed.

18. A method according to claim 17, wherein said executing step further comprises the step of executing said instruction sequences without said prefetched instructions based on said incorrect preliminary guess in accordance with load instruction information indicative of whether a first instruction in each of said is a load instruction, said pre-executing step including the step of calculating a new register value in accordance with said load instruction information, said executing step including the step of using said new register value in accordance with said load instruction information.

* * * * *